(12) United States Patent
Yu et al.

(10) Patent No.: US 7,333,219 B2
(45) Date of Patent: Feb. 19, 2008

(54) HANDHELD METROLOGY IMAGING SYSTEM AND METHOD

(75) Inventors: Dahai Yu, Redmond, WA (US); Michael Nahum, Kirkland, WA (US); Gary Olson, Kirkland, WA (US); Kim W. Atherton, Kirkland, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 342 days.

(21) Appl. No.: 11/096,497

(22) Filed: Mar. 29, 2005

(65) Prior Publication Data

US 2006/0221351 A1 Oct. 5, 2006

(51) Int. Cl.
*G01B 11/14* (2006.01)
(52) U.S. Cl. .................................... 356/615
(58) Field of Classification Search ............... 356/615; 33/501
See application file for complete search history.

(56) References Cited

U.S. PATENT DOCUMENTS

| | | | |
|---|---|---|---|
| 4,930,851 A | 6/1990 | Yamamoto | |
| 5,691,815 A * | 11/1997 | Huber et al. ................ | 356/623 |
| 6,483,542 B1 * | 11/2002 | Morinaga .............. | 348/333.06 |
| 6,538,732 B1 | 3/2003 | Drost et al. | |
| 6,667,762 B1 | 12/2003 | Bouvier et al. | |
| 6,741,287 B1 * | 5/2004 | Fuchimukai et al. ....... | 348/373 |
| 6,806,905 B1 * | 10/2004 | Morimoto et al. ..... | 348/333.02 |
| 2001/0028025 A1 * | 10/2001 | Pease ...................... | 250/208.1 |
| 2003/0095710 A1 * | 5/2003 | Tessadro ................... | 382/199 |
| 2003/0212308 A1 | 11/2003 | Bendall | |
| 2004/0008259 A1 * | 1/2004 | Gokturk et al. .......... | 348/207.1 |
| 2004/0218086 A1 * | 11/2004 | Voss et al. ................. | 348/345 |

OTHER PUBLICATIONS

LED *Illumination for Machine Vision: Lighting Techniques*, "Five New Tips for Digital Microscopes" Keyence America, <http://www.keyence.com/topics/microscopes/microscopes.html>, printed on Jul. 6, 2004.
*FA Products —VH-8000 Series High-resolution Digital Video*, Keyence Corporation, <http://www.keyence.com/products/video/vh_8000/vh8000_3.html>, printed on Jul. 6, 2004.
Digital Microscope VHX-100 Series, Keyence Corporation of America, Woodcliff, NJ, Keyence Corporation ©2003, pp. 1-20.
DG-2A Digital-Microscope, ScalarScopes—Portascope DG-2 General Information, <http://www.scalarscopes.com/dg2/dg2main1.htm>, printed Jul. 6, 2004.

* cited by examiner

*Primary Examiner*—Roy M Punnoose
(74) *Attorney, Agent, or Firm*—Christensen O'Connor Johnson Kindness PLLC

(57) ABSTRACT

A handheld metrology imaging system and method. In one embodiment, the device may comprise an imaging portion, a display portion, a signal processing and control portion, an image capture activation element and a user interface. The user interface may comprise user adjustable video measurement tools configurable relative to an image on the display portion, and video tool adjusting elements. Measurement functions are provided that operate to provide a dimensional measurement result based on the configurations of the video measurement tools. The handheld device can be used to measure not only the normal parts which have traditionally been measured by conventional handheld tools such as a caliper or micrometer, but also very small or flat parts that are difficult to measure with conventional tools.

20 Claims, 18 Drawing Sheets

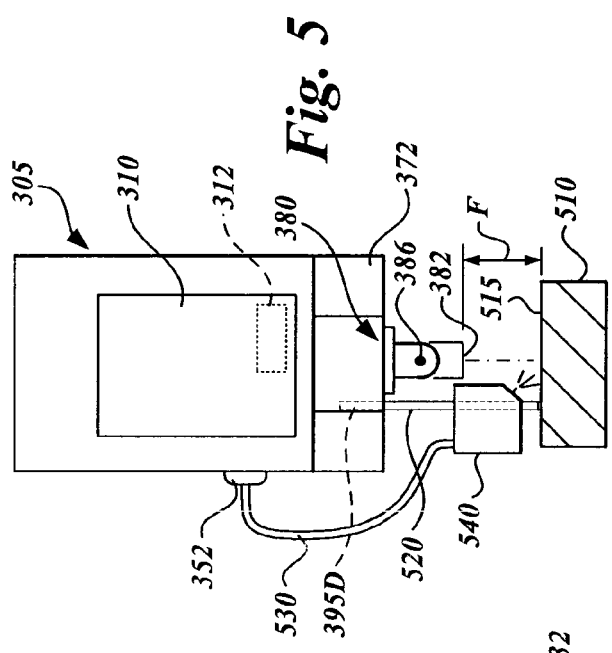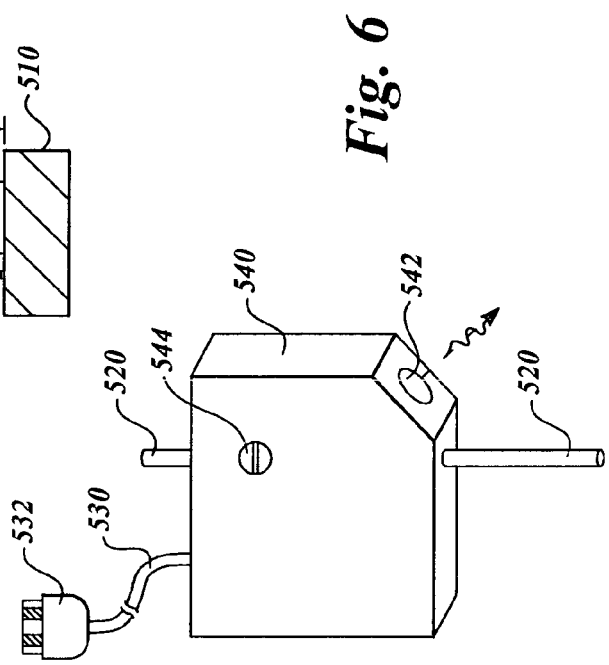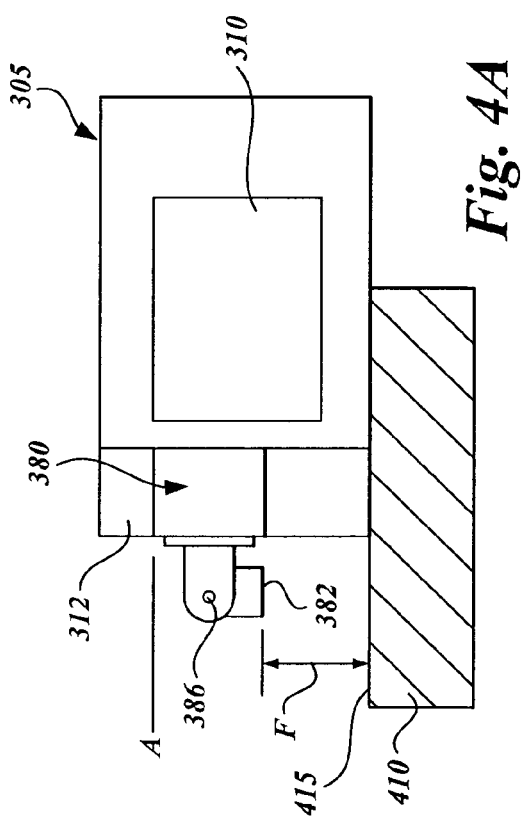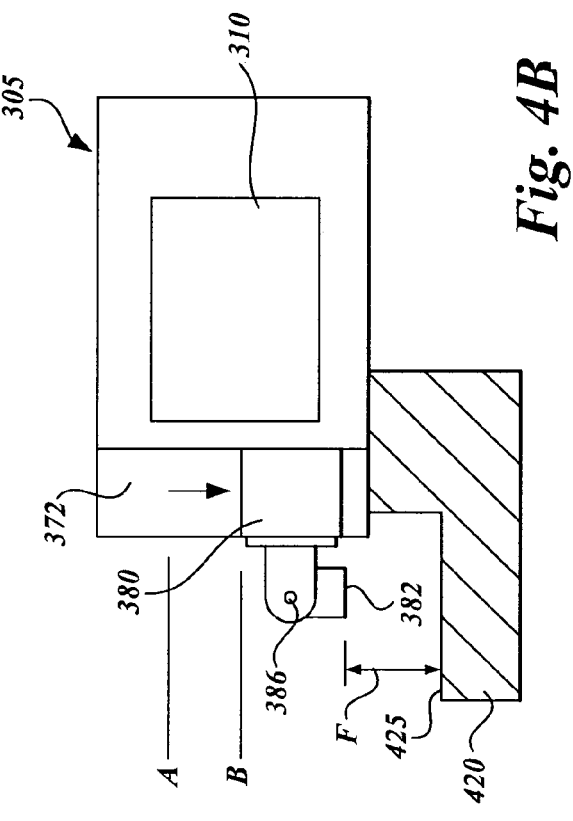

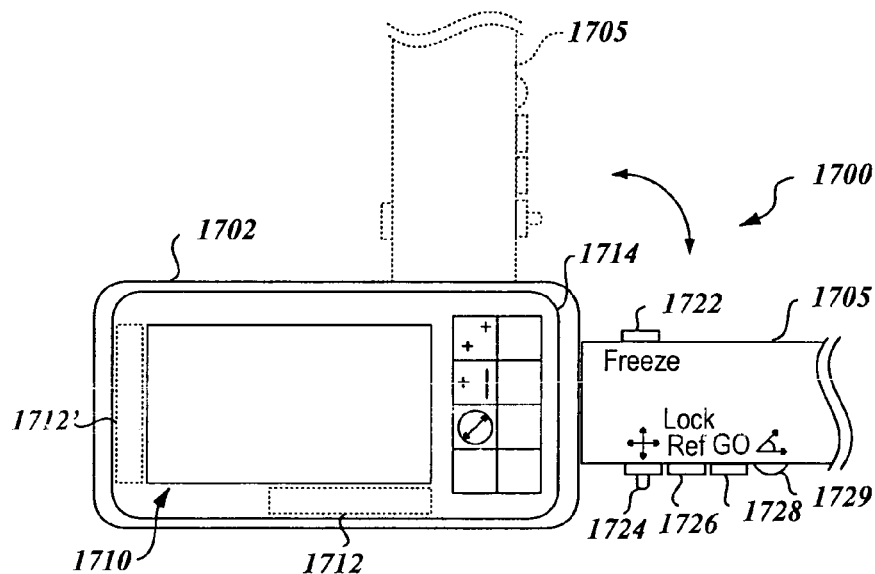
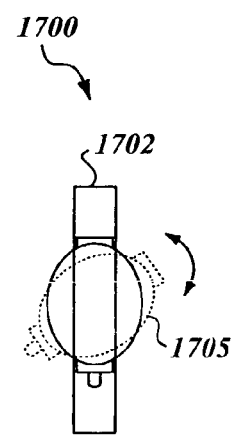
*Fig. 17A*  *Fig. 17B*
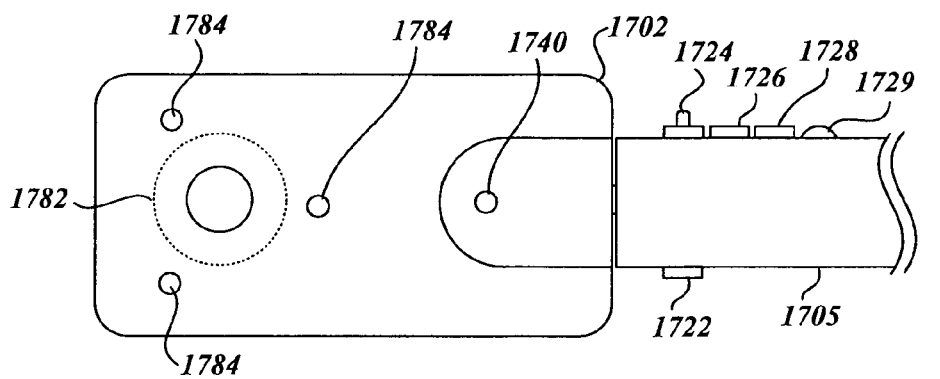
*Fig. 17C*
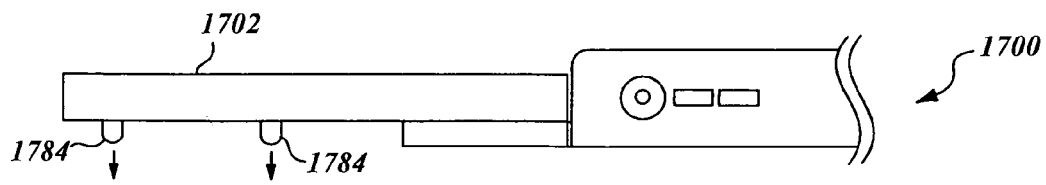
*Fig. 17D*

HANDHELD METROLOGY IMAGING SYSTEM AND METHOD

FIELD OF THE INVENTION

The present invention relates to metrology systems, and more particularly, to a handheld dimensional metrology imaging system and method.

BACKGROUND OF THE INVENTION

Measurement instruments using machine vision technology are widely used in quality assurance for both conventional and micro-sized parts and assemblies of machines, medical devices, and semiconductor products, etc. Most commercially available machine vision systems for dimensional measurement are desktop-sized or larger. In general, such systems lack mobility and flexibility with regard to the fact that a large percentage of dimensional measurements are manually performed in workshops, office spaces, and at other sites remote from convenient desktop-sized machine vision metrology system access.

The present invention is directed to providing a system and method that can overcome the foregoing and other disadvantages. More specifically, the embodiment of the present invention is directed to a handheld dimensional metrology imaging system and method.

SUMMARY OF THE INVENTION

A handheld dimensional metrology imaging system and method are provided. In accordance with one aspect of the invention, the handheld device can be used to measure not only the normal parts which have been measured by conventional hand-held tools such as a caliper or micrometer, but also very small parts and features on a planar surface, which are difficult to engage with conventional metrology tools. An additional advantage of such non-contact image-based measurement is that it will facilitate non-destructive measurements, for the measuring of soft or fragile objects.

In accordance with another aspect of the invention, the metrology device may include an imaging portion, a display portion, a signal processing and control portion, an image capture activation element, and a user interface. The user interface may include user configurable or adjustable video measurement tools, also referred to simply as "video tools", that are configurable relative to an image on the display portion, and video measurement tool adjusting elements. The device may also include preprogrammed measurement functions that operate to provide dimensional measurement results for various features in an image based on the configurations of the associated video measurement tools.

In accordance with another aspect of the invention, the position of the imaging portion of the device may be linearly adjustable along at least one direction relative to the display portion and/or housing of the device. In accordance with another aspect of the invention, the position of the imaging portion may be rotationally adjustable about at least one axis relative to the display portion and/or housing. The metrology device may further comprise at least one orientation sensing element, and the user interface may further comprise at least one orientation-sensitive video overlay element having an orientation on the display portion that may depend on the orientation of the display relative to the direction of gravity, if desired. In addition, at least one of the orientation-sensitive video overlay elements may comprise a measurement result display.

In accordance with another aspect of the invention, the user adjustable video measurement tools may include a manual point-to-point distance measurement tool, a point-to-line distance measurement tool, and a circle measurement tool. In addition, a preprogrammed measurement function associated with the point-to-line distance measurement tool may provide an automatic edge detection for at least one workpiece edge feature in a region of interest indicated by the configuration of the point-to-line distance measurement tool, and determine the location of the line based on the results of the automatic edge detection.

In accordance with another aspect of the invention, novel and efficient methods are provided for creating instances of, and determining the parameters of, various video tools. The methods include particularly ergonomic, efficient and versatile video tool definition that balance a minimal amount of cursor positioning and "button clicks" against a level of video tool "customization" control that may be desired by a user when operating a handheld dimensional metrology imaging system.

In accordance with another aspect of the invention, the device may include a handle. The handle is designed to allow users to be able to ergonomically hold the device with one hand.

In accordance with another aspect of the invention, the device may include a one or more alignment fixtures. The alignment fixtures may be interchangeably attached to or guide the metrology device to hold it at a desired focusing distance and/or orientation relative to a workpiece, for improving the imaging and/or measurement results. The alignment fixtures may also have a mechanism to help establish a correct and/or repeatable orientation of a workpiece relative to the metrology device.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 4A and 4B are diagrams illustrating first and second adjustable positions of an imaging portion of the handheld dimensional metrology imaging device of FIG. 3;

FIG. 5 is a diagram illustrating a third adjustable position of a camera of the handheld metrology imaging device of FIG. 3, along with a first exemplary alignment fixture comprising a positioning rod and an external light source;

FIG. 6 is a diagram illustrating the external light source of FIG. 5 in greater detail;

FIGS. 17A-17D are diagrams of a second exemplary embodiment of a handheld dimensional metrology imaging device in accordance with the present invention.

DETAILED DESCRIPTION OF THE PREFERRED EMBODIMENT

Figure 1:
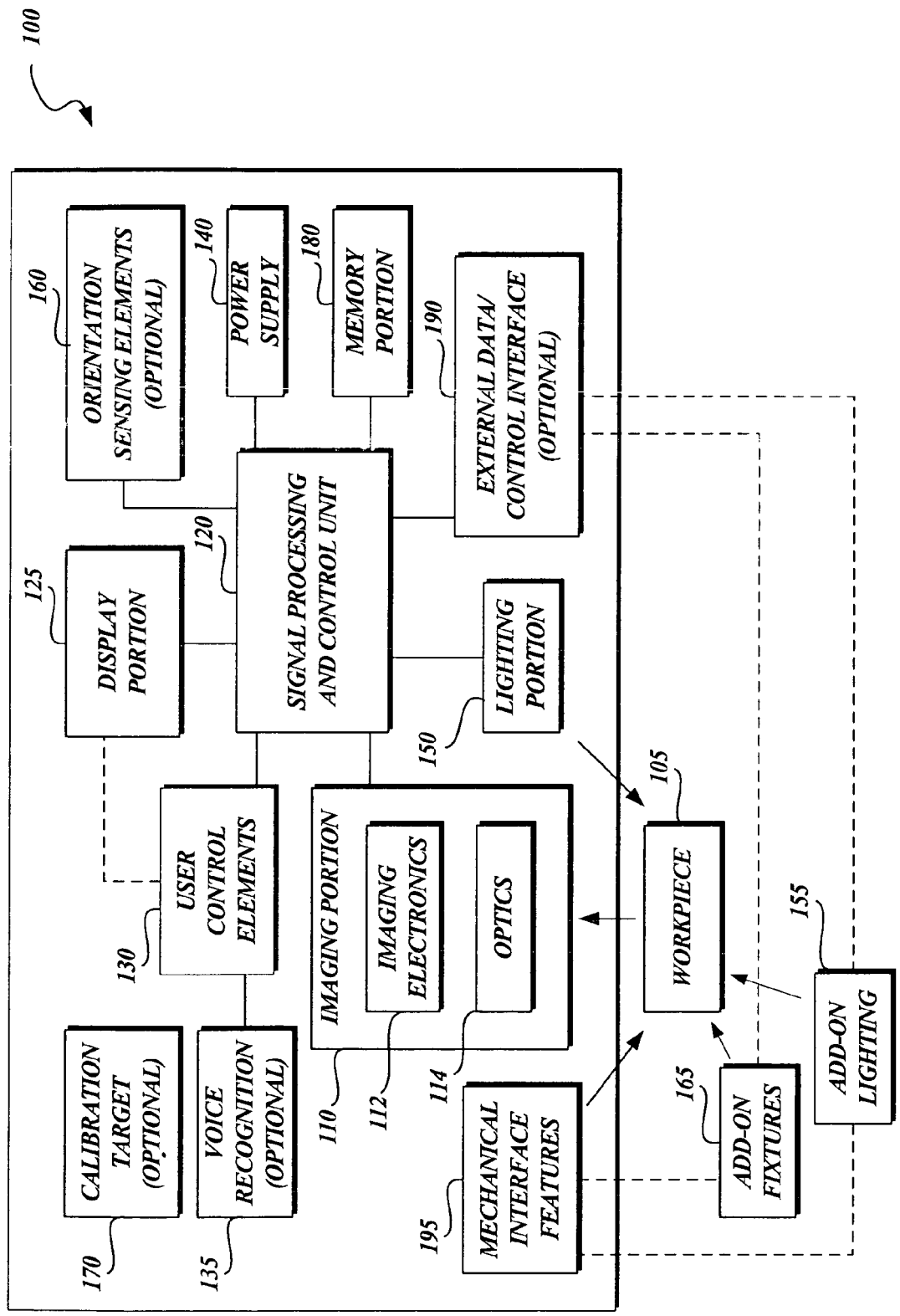
FIG. 1 is a block diagram of a handheld dimensional metrology imaging system in accordance with the present invention.

FIG. 1 is a block diagram of a handheld metrology imaging system 100 in accordance with the present invention. The handheld metrology imaging system 100 includes an imaging portion 110, a signal processing and control unit 120, a display portion 125, user control elements 130, a voice recognition portion 135, a power supply 140, a lighting portion 150, add on lighting 155, orientation sensing elements 160, add on features 165, a calibration target 170, a memory portion 180, an external data/control interface 190, and mechanical interface features 195. The handheld metrology imaging system 100 is utilized to obtain measurements of a workpiece 105. The various portions of the handheld metrology imaging system 100 may be interconnected by one or more power and signal bus connections, or by individual dedicated connections. Various signal interconnections may be made by wireless and/or optical means, if desired.

The imaging portion 110 includes imaging electronics 112 and optics 114, e.g., a lens, and/or other suitable optical component(s), if needed. The imaging electronics 112 includes an image sensor that may be a CCD, CMOS or other type of two-dimensional image acquisition device. In general, the imaging portion 112 acquires an image of the workpiece 105 being measured, at an image plane where the image sensor is positioned. A telecentric optical system may be utilized for the optics 114, such that the magnification of the acquired image is constant even when a workpiece 105 is somewhat out of focus. In one exemplary embodiment, the imaging portion 110 may provide a magnification of approximately 1.0 and a numerical aperture (NA) of approximately 0.05. The depth of focus may be approximately +/−0.2 mm. The imaging electronics 112 may provide a two-dimensional image acquisition device having approximately 640 pixels by 480 pixels and a 10 micrometer pixel pitch, which, for a magnification of approximately 1.0, may provide an imaged field of view on the workpiece that is approximately 6.4 mm by 4.8 m. Using known methods of edge detection that provide sub-pixel edge location resolution, measurement resolution on the order of 1-5 microns may be provided, depending on the limitations of the optics 114, as well as the actual focus accuracy provided by a user for a particular image. However, it will be appreciated that the foregoing imaging parameters are exemplary only, and not limiting. For example, if the optics provide for imaging a larger field of view, somewhat coarser measurement resolution may be provided. Conversely, imaging a smaller field of view with higher magnification may provide finer measurement resolution. An optional optical/digital zoom, or miniature turret lens array, or interchangeable lenses, may be included in various embodiments, to facilitate the measurement of workpieces of different sizes at different magnifications.

The signal processing and control unit 120 includes a data processing unit, which may be provided by an electronic chip, such as a DSP or a microcontroller. This unit assumes the tasks of image processing, calculating, and outputting. The display portion 125 may include a touch screen LCD, and may be operable to provide a GUI. The user control elements 130 may be provided on a control panel, which may have a number of dials, thumb sticks, scroll wheels, buttons, or the like, and/or by various elements implemented on a touch screen panel of the display portion 125, or the like. The power supply 140 may be integrated in the device, and may comprise batteries, and/or a solar cell, and a voltage regulator, or it may use power from an electrical outlet that may be converted to a suitable voltage range by a transformer, or the like.

The lighting portion 150 may be optional, but is generally included. The lighting portion 150 may include illumination control circuitry, which may include illumination power control circuitry and illumination timing circuitry that may be suitable for driving LED and/or laser diode illumination sources, incandescent bulbs, miniature xenon strobe lights, or the like, and that may operate under the control of, or in cooperation with, the signal processing and control unit 120. In some embodiments, the lighting portion 150 may also include suitable internal light sources, that is, light sources that are integrated with the handheld metrology imaging system 100, for example, as described below with reference to FIG. 3. The lighting portion 150 may also, or alternatively, be operable in conjunction with the signal processing and control unit 120, and/or the external data/control interface 190, to control add-on lighting 155, which may comprise suitable external or detachable light sources, for example, as described below with reference to FIGS. 5 and 6. The various light sources may be arranged to provide illumination at various desired angle(s) and positions relative to the work piece.

The external data/control interface 190 may comprise suitable signal conditioning and/or interface protocol circuitry, as well any desired connector configuration(s), such that accessories, such as controllable types of add-on lighting 155, may be conveniently interfaced to the handheld metrology imaging system 100. Portions of the external data/control interface 190 may be provided by, or merged with and indistinguishable from, the signal processing and control unit 120. The external data/control interface 190 may also include a wired or wireless transmitting/receiving unit, which is used to transmit, or receive information to or from computers, instruments, or other devices usable in combination with the handheld metrology imaging system 100. Such devices may provide programs or instructions that are created remotely from the handheld metrology imaging system 100, for example by text-based programming, by a compatible program associated with a larger automated vision metrology system or other programming interface provided on a PC, or by a separate identical or compatible handheld metrology imaging system. The programs or instructions may correspond to workpieces that are to be inspected using the handheld metrology imaging system 100, and may be downloaded or executable under control of the signal processing and control unit 120 through the external data/control interface 190.

The add-on fixtures 165 may include one or more alignment fixtures that may be interchangeably attached to and/or guide the handheld metrology imaging system 100, to supplement and/or extend the utility of various mechanical interface features 195, described further below, to hold it at desired focusing distance and/or orientation relative to a workpiece 105, for improving the imaging and/or measurement results. Various alignment fixtures may include means for holding or guiding corresponding workpieces, to help establish a correct and/or repeatable orientation of a workpiece 105 relative to the metrology device. In some cases, an add-on fixture 165 may include or be integrated with add-on lighting 155. In some cases, an add-on fixture 165 may include or be integrated with a memory device that includes a code, or the like, that may facilitate recalling a particular set of measurement operations or program that is stored in the memory portion 180. Alternatively, a memory device of a respective add-on fixture 165 may include respective measurement operation or program instructions that correspond to the workpieces that are to be inspected using the add-on fixture, and the measurement operation or program instructions may be downloadable or executable under control of the signal processing and control unit 120 through the external data/control interface 190. Recalling and performing a stored set of measurement operations is described below with reference to FIG. 16.

The (optional) calibration target portion 170 may include a calibration standard piece or a calibrated marking, which may comprise a carefully marked or fabricated portion of the handheld metrology imaging system 100, or may comprise a detachable or separate piece. In any case, the calibration target portion 170 may be arranged relative to the imaging portion 110 such that it may be imaged, and the imaged calibration features, at a known spacing relative to one another, may be analyzed using the handheld metrology imaging system 100 in order to determine one or more scale factors or magnification factors to be applied in order to measure features in later-acquired images.

An (optional) voice recognition portion 135 may include a microphone and circuitry sufficient to receive and interpret various voice commands, and provide corresponding signals to the signal processing and control unit 120. In general, the voice recognition portion 135 may provide a redundant method, or the only method, for performing any of the control operations, selection operations, and the like, that may be required for operating the handheld metrology imaging system 100, including various operations described in association with various manual and/or visual user control elements herein. The voice recognition portion may also provide sound or voice synthesis if desired, such that various action confirmations, mode confirmations, control actions alternatives, measurement results, and the like, may be provided by audio output to the user. The voice recognition portion 135 may also include a training and/or programming capability that allows the creation of custom commands and/or recognition that is customized for a particular individual. In one embodiment, the voice recognition portion 135 may be implemented using commercially available voice recognition circuitry, software, and/or development tools if desired, such as those associated with RSC-4X or SVC-64 series of IC's available from Sensory® Inc., Santa Clara, Calif., for example.

The memory portion 180 includes a storage medium, which may be used to save various system configuration parameters and/or operating instructions or routines, as well as to save various measurement results and/or user-created measurement routines, if desired. It will be appreciated that images taken by the device may also be saved in the memory portion 180, with or without any associated screen overlays. Discrete images of adjacent workpiece portions may be saved in the memory portion 180 and stitched together using known template-matching or image correlation technologies to register the discrete images relative to one another, to measure large features that cannot be contained in a single image, if desired. In various exemplary embodiments the memory portion 180 may include ROM and/or RAM memory, and may be merged with, or indistinguishable from, the signal processing and control unit 120.

Figure 2:
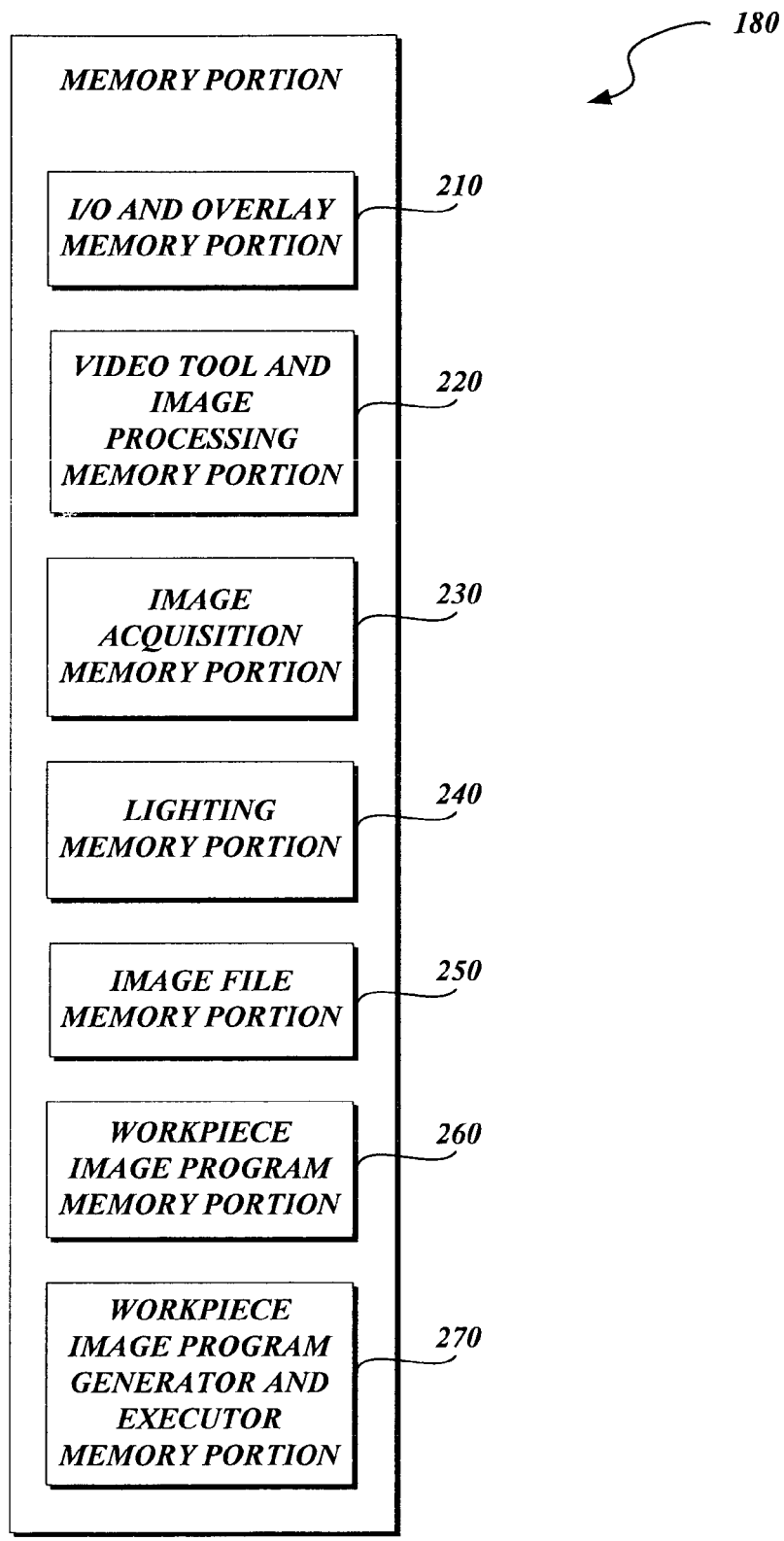
FIG. 2 is a block diagram of the memory portion of the dimensional metrology imaging system of FIG. 1.

FIG. 2 is a block diagram of one exemplary configuration usable for the memory portion 180 of FIG. 1. As shown in FIG. 2, the memory portion 180 includes an I/O and overlay memory portion 210, a video tool and image processing memory portion 220, an image acquisition memory portion 230, a lighting memory portion 240, an image file memory portion 250, a workpiece image program memory portion 260, and a workpiece image program generator and executor memory portion 270. The I/O and overlay memory portion 210 may include instructions for processing various control signals and generating corresponding screen overlays that may be superimposed on acquired images for output to a user.

Manual workpiece image inspection and/or automatic workpiece image inspection and definition may be accomplished, at least in part, by using "video tools". The video tool and image processing memory portion 220 may include instructions governing the operation and display of various video tools. Such tools may include, for example, template or pattern matching tools, dimension measuring tools, and the like. Some exemplary tools are described in greater detail below, with reference to FIGS. 9-12. More generally, tools similar to those used in a variety of commercially available machine vision inspection systems, such as the QUICK VISION® series of vision systems and the associated QVPAK® software for example, available from Mitutoyo America Corporation (MAC), located in Aurora, Ill., may be included in various embodiments. The features and operation of various video tools included in the QVPAK® software are generally described, for example, in the QVPAK 3D CNC Vision Measuring Machine User's Guide, published January 2003, and the QVPAK 3D CNC Vision Measuring Machine Operation Guide, published September 1996, each of which is hereby incorporated by reference in their entirety, for their representation of the state of the art of such video tools. One example of an exemplary edge/boundary detection tool, and associated methods that may be used for various edge detection operations associated with various video tool components described further below, is disclosed in U.S. patent application Ser. No. 09/987,986, which is incorporated by herein by reference in its entirety.

The image acquisition memory portion 230 may include various parameters and/or instructions usable in relation to control of the image electronics 112, exposure control, and the like. It may also include instructions for controlling various focus-related operations. For example, in one embodiment, the user interface of the handheld metrology imaging system 100 may include "focus feedback" elements usable to indicate whether a user should move the device closer to or farther away from a workpiece in order to achieve better focus. The focus feedback elements may alternatively or additionally include a state indicating that a current focus is adequate and that the corresponding position should be held steady. Such elements may be governed by image contrast analysis and feedback instructions included in the image acquisition memory portion 230. In another embodiment, image contrast analysis operations may be used to analyze sequential images acquired in real time, as a user attempts to focus either with or without the aid of the previously described focus feedback elements. Based on the real-time contrast analysis operations, the handheld metrology imaging system 100 may automatically select a sufficiently focused image, to be used for inspection purposes. Such operations may be governed by image contrast analysis and feedback instructions included in the image acquisition memory portion 230.

The lighting memory portion 240 may include various parameters and/or instructions usable in relation to the lighting portion 150. For example, various parameters and/or routines usable for setting illumination and exposure control durations and power levels, and the like, as well as various illumination-related power conservation routines, may be included. The workpiece image program memory portion 260 may be used to store user-created operation sequences or programs that may be used to automatically analyze corresponding types of workpiece images. The operation sequences or programs may be saved with a unique identifying name or program address, and later recalled, for example, as outlined below with reference to FIGS. 13-16. The workpiece image program generator and executor memory portion 270 may include various instructions and/or routines that may be used for creating, saving, recalling, and executing such operation sequences or programs.

Figure 3:
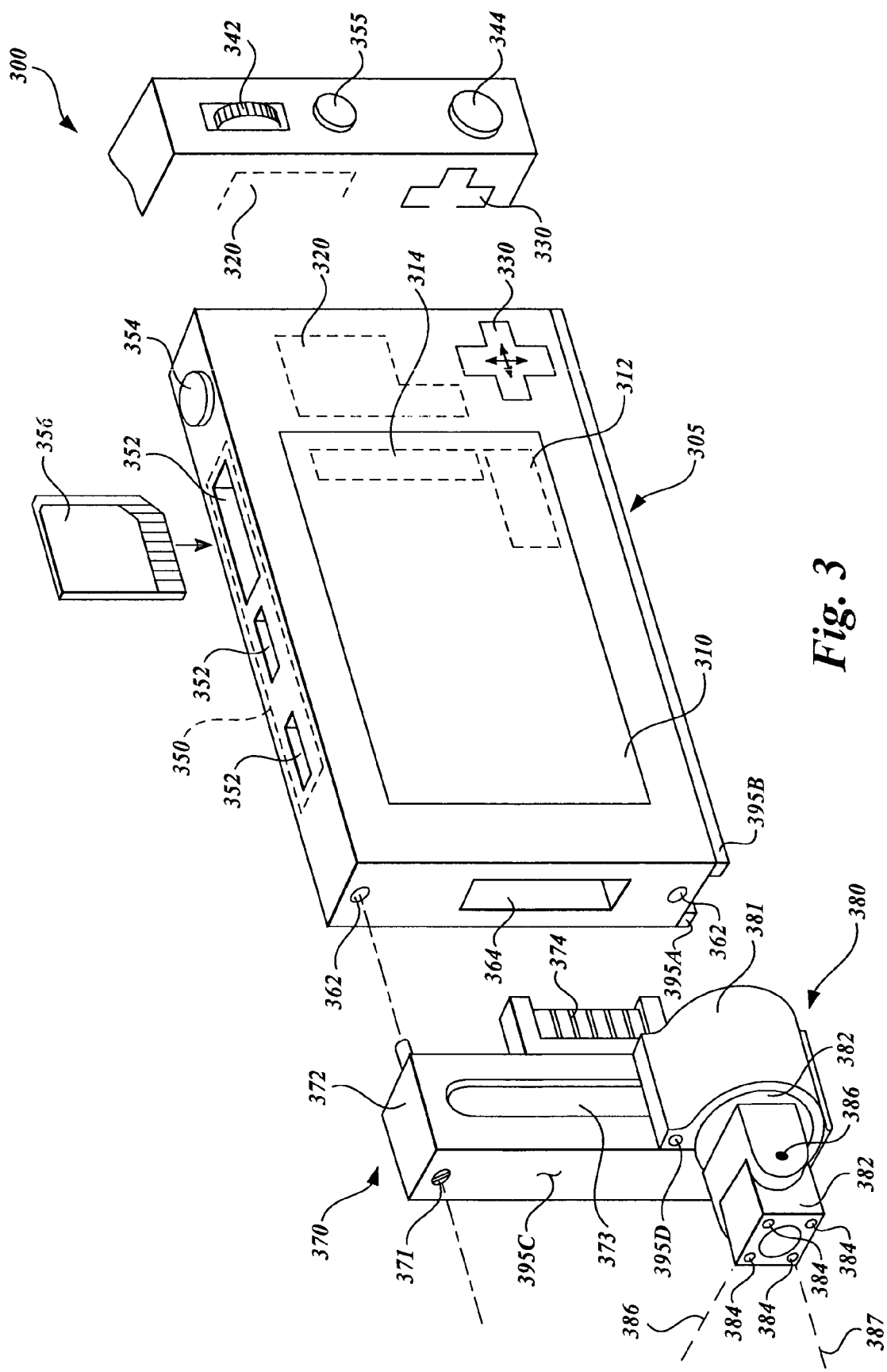
FIG. 3 is an isometric diagram of first exemplary embodiment of a handheld dimensional metrology imaging device in accordance with the present invention.

FIG. 3 is an isometric diagram of a first exemplary embodiment of a handheld metrology imaging device 300. As shown in FIG. 3, the handheld metrology imaging device 300 may include a control and display portion 305 that may include a display region 310, a control button region 320, a cursor control 330, a thumbwheel 342, a lighting button 355 (optional), image acquisition buttons 344 and 354 (also referred to as "freeze" buttons herein), an accessory connector region 350, and an adjustable imaging portion 370.

The display region 310 may include a measurement result region 312 and an adaptive icon/label region 314. The control button region 320 and the associated adaptive icon/label region 314, cursor control 330, thumbwheel 342 and acquisition buttons 344 and 354, comprise controls which a user may utilize to acquire images and obtain measurements, as will be described in more detail below. The thumbwheel 342 (or a slider, or pressure-sensitive miniature "joystick" or thumb stick, or the like) may provide for rapid scrolling of a selector along a menu or list, or movement of a cursor or other indicator or tool portion across the display region 310 screen, to control a lighting intensity or other parameter. Various exemplary uses of the thumbwheel 342, or the like, are described further below.

The accessory connector region 350 may include a plurality of external data interfaces/connectors 352 and may receive various removable memory cards 356 that connect for receiving and/or providing stored images, workpiece inspection operation instructions or routines, and the like. External data interfaces/connectors 352 may also be used to connect control signals and/or power to or from add-on lighting, for example, as illustrated by the examples shown in FIGS. 5 and 6.

The control and display portion 305 may also include various mechanical interface features, such as guiding or alignment features positioned on any desired surface, as exemplified by the relatively straight and wear-resistant guide rails 395A and 395B, shown in FIG. 3. Such alignment features may be positioned to sit or slide on a workpiece surface, or an add-on fixture alignment feature, or the like, in order to assist in positioning the handheld metrology imaging device 300 and a stable focus position relative to a workpiece. The control and display portion 305 may also include a connector port 364 for receiving a mating connector 374 of the adjustable imaging portion 370, in order to provide power and signal connections between electronics included in the adjustable imaging portion 370 and the control and display portion 305. Mounting holes 362 may be used for securely attaching the adjustable imaging portion 370, using mounting screws 371, or the like.

The adjustable imaging portion 370 may include a linear track portion 372 and a camera positioning portion 380 that is mounted to a linear bearing (not shown) inside the linear track portion 372 through a slot 373, such that it may be positioning along the length of the linear track portion 372. The linear track portion 372 may include various guiding or alignment surfaces, edges or other features, as exemplified by the relatively straight and wear-resistant surface 395C. The camera positioning portion 380 may include a locking feature (not shown) such as a thumb screw, or cam, or the like, that allows a user to lock its position at a desired location along the linear track portion 372.

The camera positioning portion 380 includes a camera/optics head 382 that may include elements previously described with reference to the imaging portion 110 of FIG. 1, and which may also include miniature light sources 384. Miniature light sources 384 may be provided by miniature LED devices, or the ends of optical fibers that are routed from an illumination source located elsewhere in the adjustable imaging portion 370, or the like. The camera positioning portion 380 may include a translating element 381, a rotating element 382, and a swivel axis 386. The camera/optics head 382 may be mounted to pivot about the swivel axis 386 relative to the rotating element 382, and the rotating element 382 may be mounted to rotate about a rotation axis 383 relative to the translating element 381. The translating element 381 may include a mounting/alignment hole 395D, for a mounting a rod that aids in focusing and illumination positioning, as described in greater detail below with respect to FIGS. 5 and 6. Known types of flexible connections may be provided from the imaging electronics, and any illumination elements, provided in the camera/optics head 382 to electronics or illumination elements that may be included inside the linear track portion 372, and/or to the mating connector 374, in order to accommodate various rotations and translations of the camera positioning portion 380. Thus, the camera/optics head 382 may be conveniently positioned in a variety of stable orientations relative to the control and display portion 305 of the handheld metrology imaging device 300, and relative to a workpiece feature to be imaged.

According to the foregoing description, a user may position and/or guide the handheld metrology imaging device 300 relative to a workpiece in any of a number of configurations that are ergonomically favorable, or that provide particularly stable and convenient focusing relative to a workpiece feature to be imaged. It should be appreciated that such considerations may be quite important when the handheld metrology imaging device 300 is used to perform relatively high precision metrology for small or microscopic features, and/or use magnifying lenses that may have short working distances and/or a small depth of focus. More generally, one or more translational and/or rotational degrees of freedom may allow convenient viewing of the control and display portion 305 while also positioning the camera/optics head 382 such that it may view and focus on various features that may be adjacent to elevated surfaces or corners, which may furthermore be oriented vertically, horizontally, or upside down, depending on the situation. In the absence of one or more translation and or rotational degrees of freedom, it may be found that there are numerous situations in which it is not possible to arrange the camera/optics head 382 at an operable focus position relative to a desired feature to be inspected, due to adjacent interfering surfaces, or the like.

Furthermore, it should also be appreciated that being able to adjust the relative orientation between the camera/optics head 382 and the control and display portion 305, for convenient viewing and operation, may provide significantly increased efficiency in a number of applications. As one example, in various applications the handheld metrology imaging device 300 may be used to measure dozens or hundreds of similar features on a surface, for example, a number of drilled holes on the skin of an aircraft, or a number of printed or stamped features on a sheet, or the like. In such applications, being able to adjust the relative position of the camera/optics head 382 such that it focuses at a desired workpiece plane when a guiding or alignment feature of the handheld metrology imaging device 300 is positioned against a selected surface or feature of the workpiece, may be particularly valuable.

The first exemplary embodiment of a handheld metrology imaging device 300 is illustrated and described in terms of a separate control and display portion 305 and an adjustable imaging portion 370 that are assembled together. In various embodiments, the display portion 305 may comprise a commercially-available personal digital assistant (PDA), or an analogous electronic unit having a customized housing and control elements, or a fully customized electronic unit, or the like. However, such a configuration is exemplary only. In various other embodiments a handheld metrology imaging device may be fabricated such that these portions are merged and/or indistinguishable. A handheld metrology imaging device may be provided in a volume that is at least as small as 26 cubic inches for some embodiments, and at least as small as 18 cubic inches for other embodiments. For example, the handheld metrology imaging device 300 may be provided in a volume at least as small as 18 cubic inches, if desired.

FIGS. 4A and 4B are diagrams illustrating first and second exemplary positions of the camera positioning portion 380 relative to the control and display portion 305 of the handheld metrology imaging device 300. As shown in FIG. 4A, the camera positioning portion 380 begins at a height A, with the camera/optics head 382 swiveled about the swivel axis 386 to aim in a downward direction at a proper image focus height F from a surface 415 that is to be imaged on an object 410. As shown in FIG. 4B, the camera positioning portion 380 has been repositioned along the linear track portion 372 to a height B, to again obtain the proper image focus height F from a surface 425 that is to be imaged on an object 420. This repositioning of the camera positioning portion 380 illustrates the flexibility of the imaging device for conveniently obtaining images of differently sized and shaped objects which are accessible from certain angles and positions.

FIG. 5 is a diagram illustrating a third position of the camera positioning portion 380 relative to the control and display portion 305 of the handheld metrology imaging device 300. As shown in FIG. 5, the control and display portion 305 has been rotated relative to its orientation in FIGS. 4A and 4B, and the camera/optics head 382 has been swiveled about the swivel axis 386 to aim in a downward direction at the proper image focus height F from a surface 515 that is to be imaged on an object 510. An add-on mechanical interface fixture, a positioning rod 520, is shown mounted into the mounting/alignment hole 395D. The positioning rod 520 may be used to conveniently obtain the proper image focus height F, and provide stability during image acquisition. The positioning rod 520 may also be used to conveniently position an add-on light source 540 to provide illumination at a desired height and orientation relative to the field of view of the camera/optics head 382. The add-on light source 540 may include a power and/or control signal line 530 which may be connected to the control and display portion 305 through an external data interface/connector 352, as previously described.

FIG. 6 is a diagram of the add-on light source 540 of FIG. 5. As shown in FIG. 6, the add-on light source 540 includes a light source 542 for illuminating the field of view on the surface 515 of the object 510. A set screw 544 may be used for locking the position of the add-on light source 540 relative to the positioning rod 520 and the handheld metrology imaging system 300. The power and/or control signal line 530 is shown to include an interface plug 532 for connecting to the data interface/connector 352.

Figure 7:
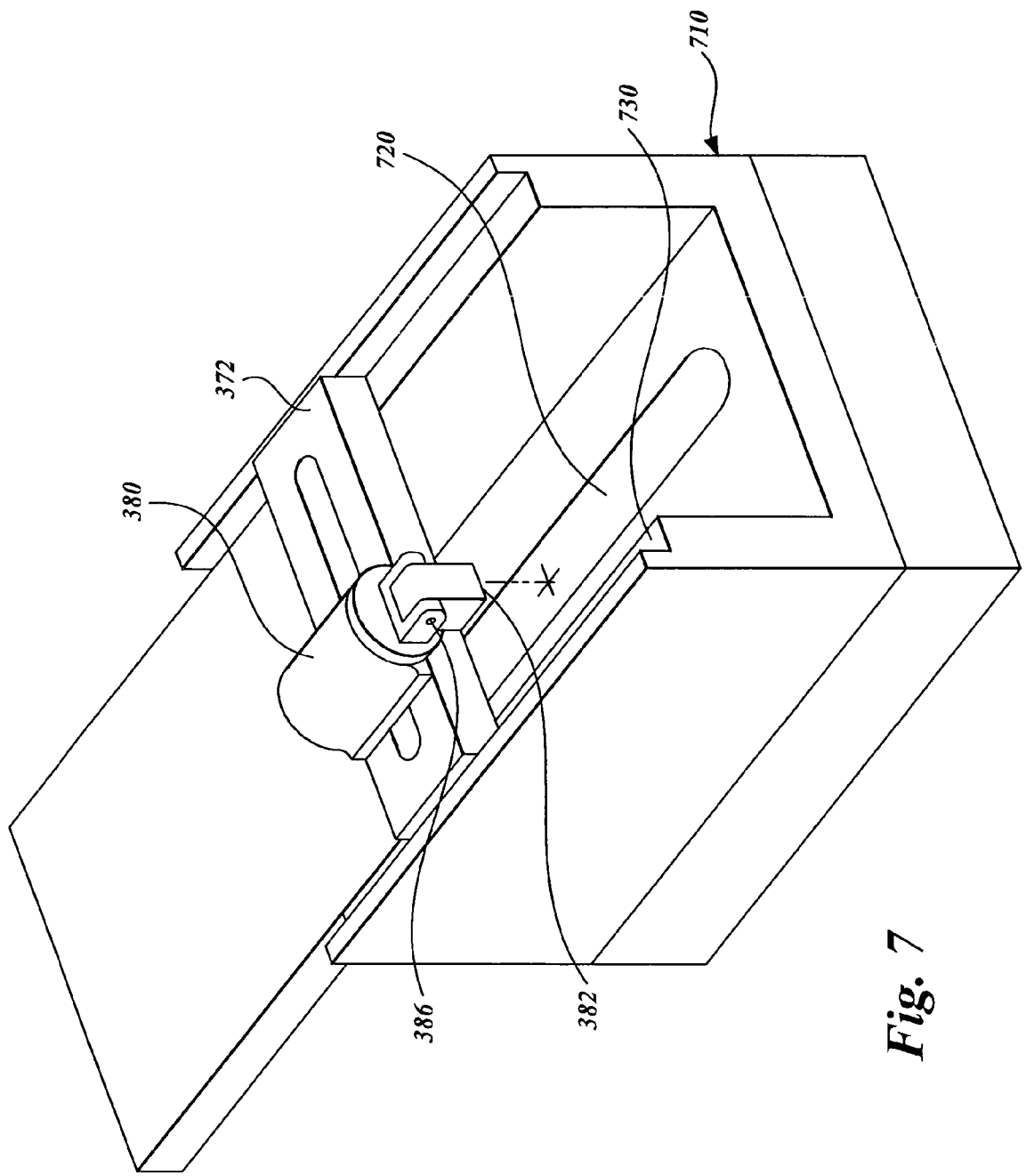
FIG. 7 is a diagram of a second exemplary alignment fixture usable in conjunction with the handheld metrology imaging device of FIG. 3.

FIG. 7 is a diagram of an exemplary add-on fixture 710 usable in conjunction with a handheld metrology imaging system such as that shown in FIG. 3. The add-on fixture 710 may include a backlighting portion 720 and/or other illumination sources if desired, and sliding guides 730 in which a handheld metrology imaging system may slide back and forth relative to a workpiece positioned between the backlighting portion 720 and the camera/optics head 382. As shown in FIG. 7, the camera/optics head 382 has been rotated about the swivel axis 386 to be pointing down towards a workpiece (not shown) positioned above the backlighting 720 of the mounting device 710, and the camera positioning portion 380 has been positioned along the linear track portion 372 such that it is aligned along the backlighting portion 720. One or more features to be inspected, for example one or more through holes, may be positioned or fixtured according to a desired focusing plane and/or along the backlighting portion 720, and the corresponding images may be conveniently acquired as the a handheld metrology imaging system is positioned along the sliding guides 730. In various embodiments, the height of the sliding guides may be adjustable, to facilitate adjustment of the focusing plane of a handheld metrology imaging system relative to a workpiece.

Figure 8:
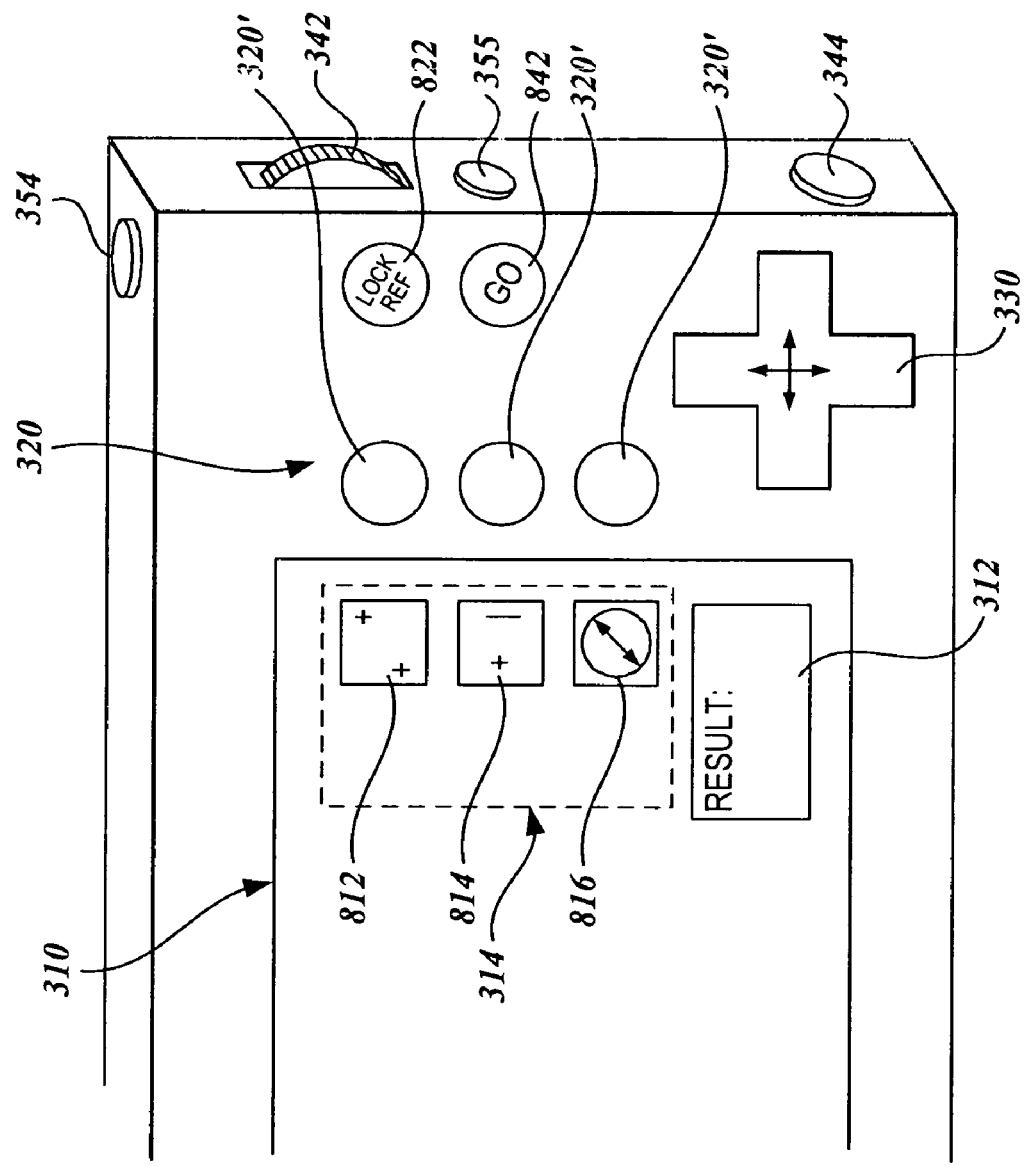
FIG. 8 is a diagram of one exemplary layout usable for the control panel and display portions of the handheld metrology imaging device of FIG. 3.

FIG. 8 is a diagram of one exemplary arrangement that may be used for the display region 310, control button region 320, cursor control 330, thumbwheel 342, a lighting button 355 (optional), and image acquisition buttons 344 and 354 (also referred to as "freeze" buttons herein) of the exemplary handheld metrology imaging system 300 shown in FIG. 3. As shown in FIG. 8, the display portion 310 may include the adaptable icon/label region 314, which may in one configuration include a point-to-point tool icon 812, a line-to-point tool icon 814, and a circle tool icon 816. The measurement result region 312 may display a measurement result obtained by use of the video tools, or other means. The control button region 320 may include control buttons 320' that may have predetermined control functions in some embodiments. However, in other embodiments, each respective control button 320' is preferably useable to activate the operations associated with whatever adjacent respective adaptable tool icon, menu item, or the like, that is currently displayed in the adaptable icon/label region 314. The control button region 320 may include additional control buttons, such as a lock reference button 822 and a go button 824, which may provide operations outlined further below.

Image acquisition buttons 344 and 354 are redundant. Therefore, one of the buttons may be optional in various embodiments. However, redundant image acquisition buttons, positioned in two different orientations relative to the display portion 310, may be ergonomically convenient for triggering image acquisition, depending on the orientation of the handheld metrology imaging system 300 during use. For example, as shown in FIG. 1, a handheld metrology imaging system may include an orientation sensing element, for example a tilt sensor, an accelerometer, or a triaxial accelerometer, or the like. In one embodiment, when the handheld metrology imaging system 300 is being held by a user in the orientation shown in FIG. 4A, for example, an orientation sensing element may output signals that cause the elements of a screen overlay that is superimposed on the workpiece image to be adaptively oriented such that it is "right side up". The orientation sensing element may also output signals that enable the image acquisition button 354 and disabled the image acquisition button 344, making it convenient for a right-handed user to trigger a desired image acquisition with a finger of the right hand on the image acquisition button 354. Similarly, when the handheld metrology imaging system 300 is being held by a user in the orientation shown in FIG. 5, for example, the orientation sensing element may output signals that cause the elements of the screen overlay to be oriented such that it adapts to remain "right side up" in this new orientation and may also output signals that enable the image acquisition button 344 and disabled the image acquisition button 354, making it convenient for a right-handed user to trigger a desired image acquisition with a finger of the right hand on the image acquisition button 344. Such considerations may be particularly important for making the handheld metrology imaging system 300 ergonomically manageable, especially when it must be triggered while also being carefully manually positioned for best focus and precise imaging, possibly with the aid of one or more focus feedback elements (previously described), which may comprise LED's that may be turned on or off or modulated in intensity based on the focus state, or may comprise feedback elements displayed by the screen overlay, in various embodiments.

An image acquisition button may, in some embodiments, function similarly to the "shutter" button of a conventional camera, in order to capture an inspection image that may be held or recalled for performing inspection operations, as outlined further below. However, in various other embodiments, it is preferred that an image acquisition button may operate to "freeze" and/or "unfreeze" a real-time workpiece image displayed in the display region 310. In one such embodiment, when the freeze button 344 or 354 triggers an image acquisition, the acquired image is then continuously displayed in the display region 310, appearing "frozen". The user may then evaluate the image to determine whether it is suitable for desired metrology operations, and if so, perform the metrology operations on that image. However, if the user determines that the acquired (frozen) image is unsuitable, then by pressing the freeze button 344 or 354 again to "unfreeze" the display, real-time workpiece imaging will resume in the display region 310, until the freeze button 344 or 354 is again pressed to acquire an image. This cycle may be repeated any desired number of times until the user determines that a suitable image has been acquired.

This type of operation may have particular utility when a previously programmed or saved set of metrology operations metrology operations is repeated or recalled, and it may be desirable to capture a suitable image at approximately a desired location relative to the field of view and/or the frame of the display region 310. In such a case, it may be desirable or convenient to capture an image such that a particular workpiece feature is located within (or nearly within) a region of interest of a previously programmed video tool that is displayed in a screen overlay, for example, as shown and described with reference to FIGS. 15A-15D below. In such a case, the previously described freeze-unfreeze cycle may be repeated until such an image is achieved.

It should be appreciated that a rotatable control element, such as the thumbwheel 342, or the like, may be a particularly versatile control element for use in a compact handheld dimensional metrology imaging system. It may be particularly convenient for performing various adjustments, for example, as outlined further below. Alternatively, a rotatable control element that has its face exposed, rather than its periphery, may be suitable positioned on a handheld dimensional metrology imaging system, and used instead of a thumbwheel. However, despite certain advantages, the arrangement of features shown in FIG. 8 and the functions described above are exemplary only, and not limiting. Fewer, more, or different, control elements and/or functions may be provided in various embodiments.

Figure 9A:
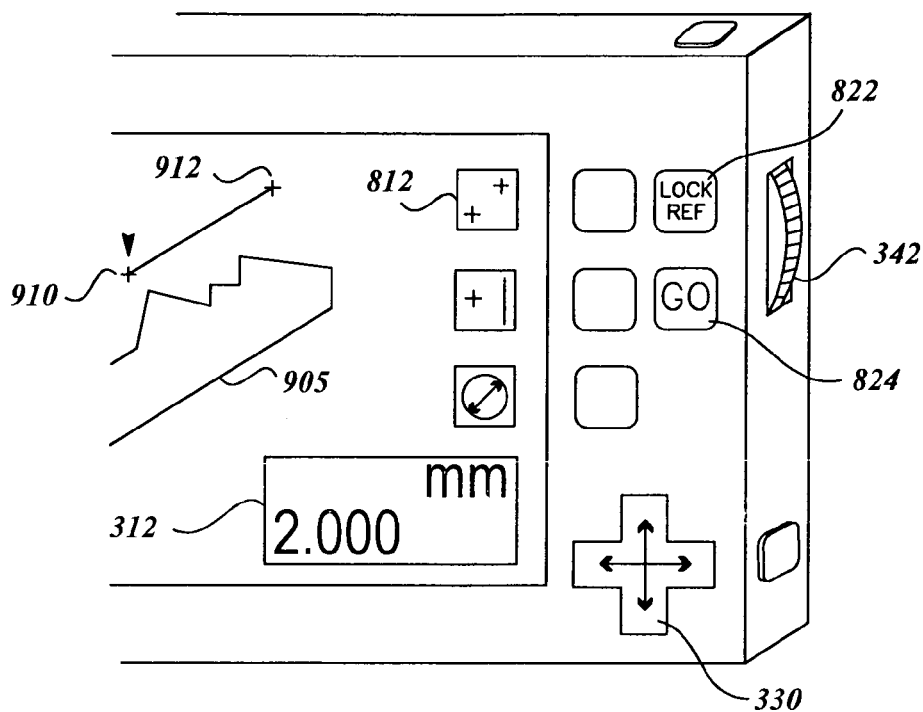
FIGS. 9A-9D are diagrams of the control panel and display portions of FIG. 8 illustrating the use of an exemplary point-to-point tool.

FIGS. 9A-9D illustrate one exemplary set of operations usable to implement a point-to-point video metrology tool. As shown in FIG. 9A, once the point-to-point tool icon 812 is selected (for example, by pressing the adjacent control button), point indicators 910 and 912 may appear at a default location in the display region 310. The measurement result region 312 may begin to continuously update and display the current measurement distance between the point indicators 910 and 912. One of the point indicators, in this case the point indicator 910, may include a "currently active" indicator, for example, the small arrowhead located just above the point indicator 910 in FIG. 9A, to show that it is the target for the next positioning or adjustment operation.

Figure 9B:
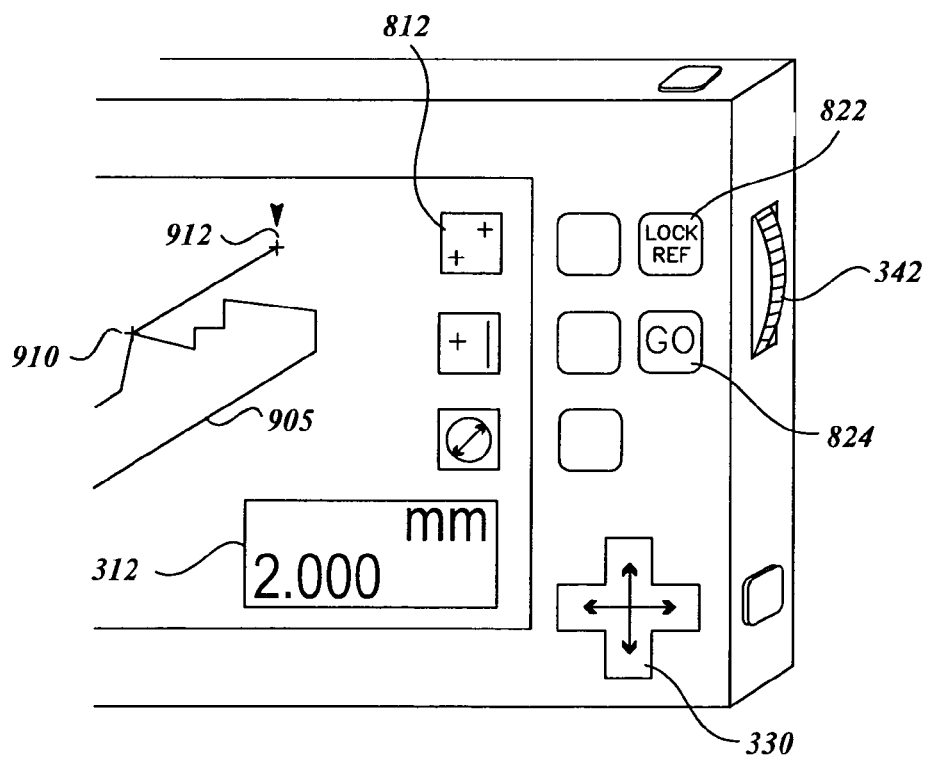

As shown in FIG. 9B, the user may then move the "currently active" point indicator 910 down to a desired measuring position on the measurement object 905 using the cursor control 330, or other suitable now-known or later-developed control element, including a touch screen drag operation and/or a stylus, or the like. In the embodiment shown in FIG. 9B, the entire video tool is dragged along with this change in the position of the point indicator 910, however, in various embodiments point the indicator 910 may move independently from the point indicator 912. In any case, after positioning the point indicator 910, the user may then press the "LOCK REF" button 822, to lock the current position of the point indicator 910 as a reference point for a measurement. This operation may also trigger the "currently active" indicator to appear near the point indicator 912, to show that it is the target for the next positioning or adjustment operation.

Figure 9C:
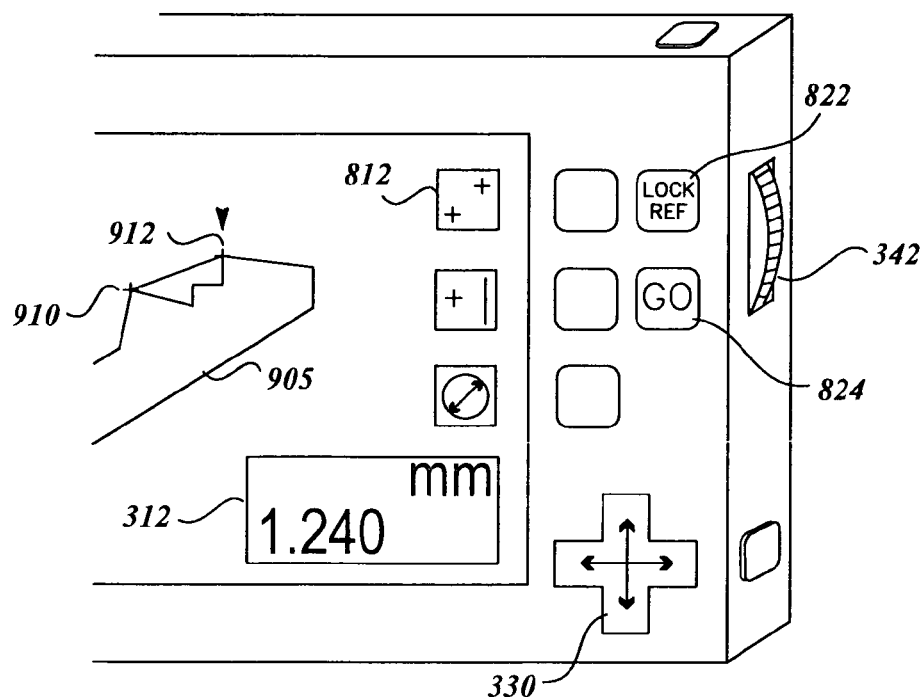

As shown in FIG. 9C, the user may then move the "currently active" point indicator 912 down to a desired measuring position on the measurement object 905 using the cursor control 330, or the like. The measurement result region 312 may continuously update and display the current measurement distance between the point indicators 910 and 912.

Figure 9D:
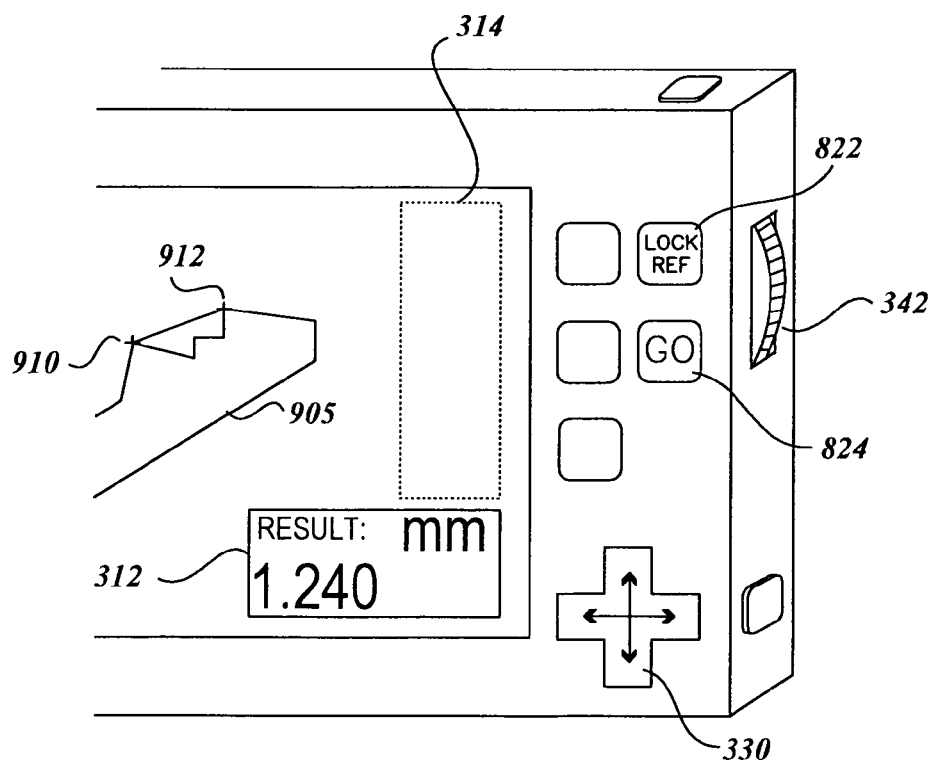

As shown in FIG. 9D, in an additional optional step for the point-to-point tool, the user may press the "GO" button 824, to indicate completion of the previous measurement operations. As a result, the "currently active" indicator may disappear, the point indicator 912 may be locked in position, and the associated final measurement result, which represents the distance between the point indicators 910 and 912 may be displayed as a "RESULT" in the measurement result region 312. In addition, in various embodiments, when the "GO" button 824 is pressed to indicate completion of the previous measurement operations, the control element configuration and/or contents of the adaptive icon/label region 314 may be updated to include new control options associated with the control buttons 320'. In various exemplary embodiments, the "GO" button 824 may function similarly to the conventional "ENTER" key function on a conventional computer keyboard. In one embodiment, when the "GO" button 824 is selected to complete the operation of the point-to-point tool, a sequence of "save" or "repeat" operations similar to those described below with reference to FIGS. 13-16 may be initiated.

In various embodiments, the "LOCK REF" button 822 may operate such that it may be used repeatedly to, in effect, control which of the point indicators, or other positionable tool components, are "currently active" and positionable. For example, in such embodiments, after positioning the "currently active" point indicator 912 as described above with reference to FIG. 9C, if the user then decides to further adjust the position of the previously positioned point indicator 910, the user may press the "LOCK REF" button again. As a result, the current position of the point indicator 912 would be locked as a reference point for a measurement and the "currently active" indicator would then appear near the point indicator 910 again, to show that it may once again be the target for a positioning or adjustment operation. In such embodiments, the "LOCK REF" button could be operated in this manner as many times as desired, to repeatedly "toggle" which of the point indicators or other tool components is currently active for positioning or adjustment. Of course, a different or additional control element could also be used to provide a similar function, if desired.

Figure 10A:
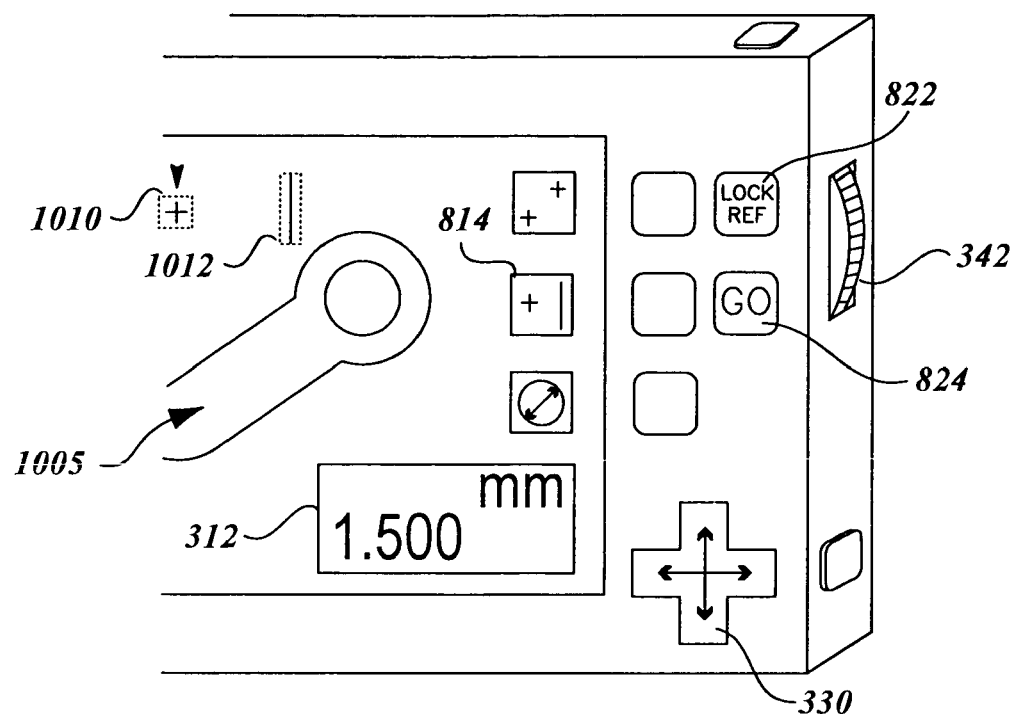
FIGS. 10A-10D are diagrams of the control panel and display portions of FIG. 8 illustrating the use of an exemplary point-to-line tool.

FIGS. 10A-10D illustrate one exemplary set of operations usable to implement a point-to-line video metrology tool. As shown in FIG. 10A, once the point-to-line tool icon 814 is selected (for example, by pressing the adjacent control button), an edge point tool component 1010 and a line tool component 1012 may appear at a default location in the display region 310. The measurement result region 312 may begin to continuously update and display the current measurement distance between the edge point tool component 1010 and a line tool component 1012. One of the tool components, in this case the edge point tool component 1010, may include a "currently active" indicator, for example, the small arrowhead located just above the edge point tool component 1010 in FIG. 10A, to show that it is the target for the next positioning or adjustment operation.

It should be appreciated that, whereas the point indicators 910 and 912 of the point-to-point tool may be passive elements that register a position according to their placement by the user, the point-to-line tool components 1010 and 1012 include automatic edge/boundary detection capabilities, according to known methods. For example, a similar point tool and line tool (also referred to as a box tool), as well a circle tool similar to that described with reference to FIGS. 11 and 12, may be found in QVPAK® software (see the QVPAK 3D CNC Vision Measuring Machine User's Guide, incorporated by reference above.) Briefly, a point tool generates (locates) a measurement data point at the intersection of a single video scan line (that is, a line of image pixels) with an edge feature in an image. A line or box tool generates a series of parallel scan lines, each of which returns a data point where an edge feature is found. A circle tool generates a series of radial scan lines through 360 degrees centered about an origin, each of which returns a point where an edge feature is found. Generally, such tools operate (that is, perform their automatic edge-detection operations) within a defined region of interest, which is often circumscribed by a region of interest boundary on a display, in order to indicate the location of the region of interest. The region of interest of the edge point tool component 1010 and a line tool component 1012 are similarly indicated by the circumscribing dashed lines shown in FIGS. 10A-10D.

Figure 10B:
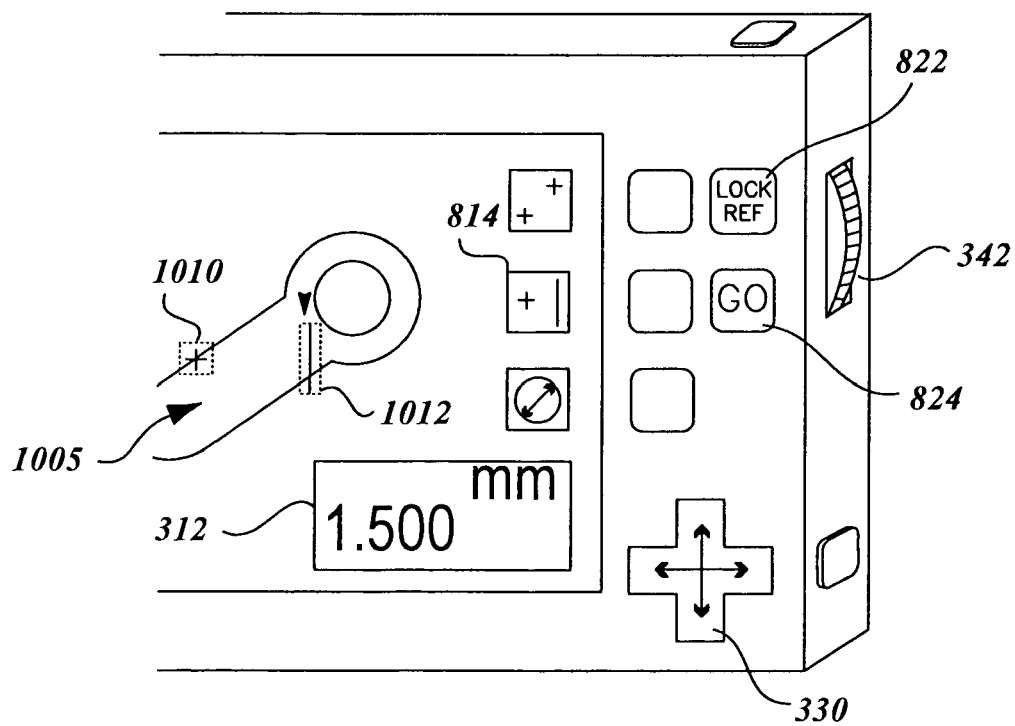

As shown in FIG. 10B, the user may then move the "currently active" edge point tool component 1010 to a desired measuring position on the measurement object 1005 using the cursor control 330, or other suitable control element. In the embodiment shown in FIG. 10B, the entire video tool is dragged along with this change in the position of the edge point tool component 1010, however, in various embodiments the edge point tool component 1010 may move independently from the line tool component 1012. In any case, after positioning the edge point tool component 1010, the user may then press the "LOCK REF" button 822, to lock or anchor the current position of the region of interest of the edge point tool component 1010. This operation may also trigger the "currently active" indicator to appear near the line tool component 1012, to show that it is the target for the next positioning or adjustment operation.

Figure 10C:
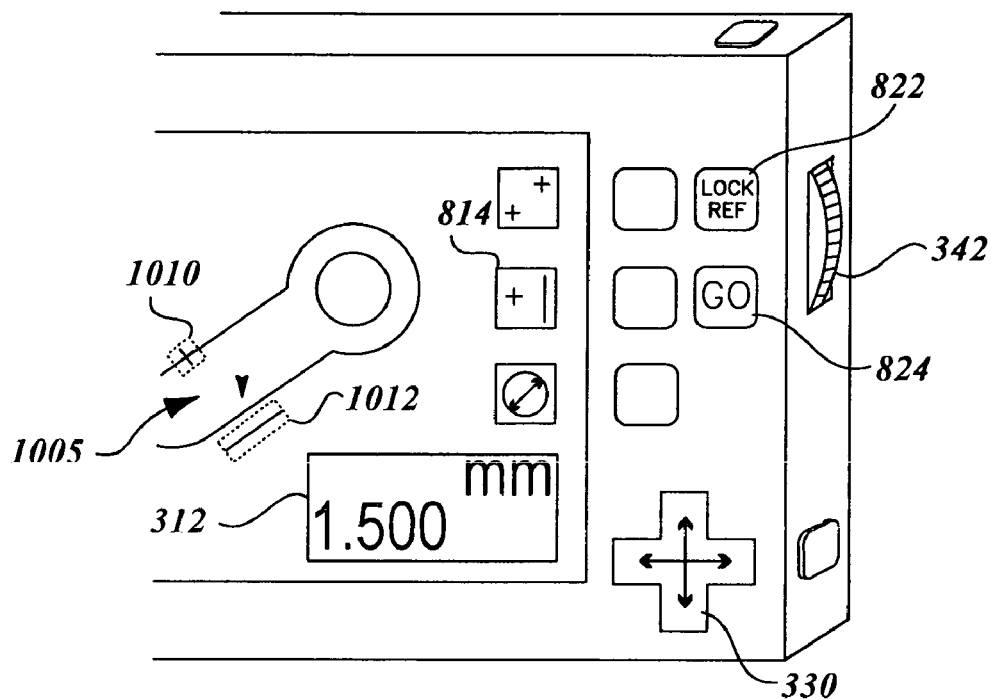
Figure 10D:
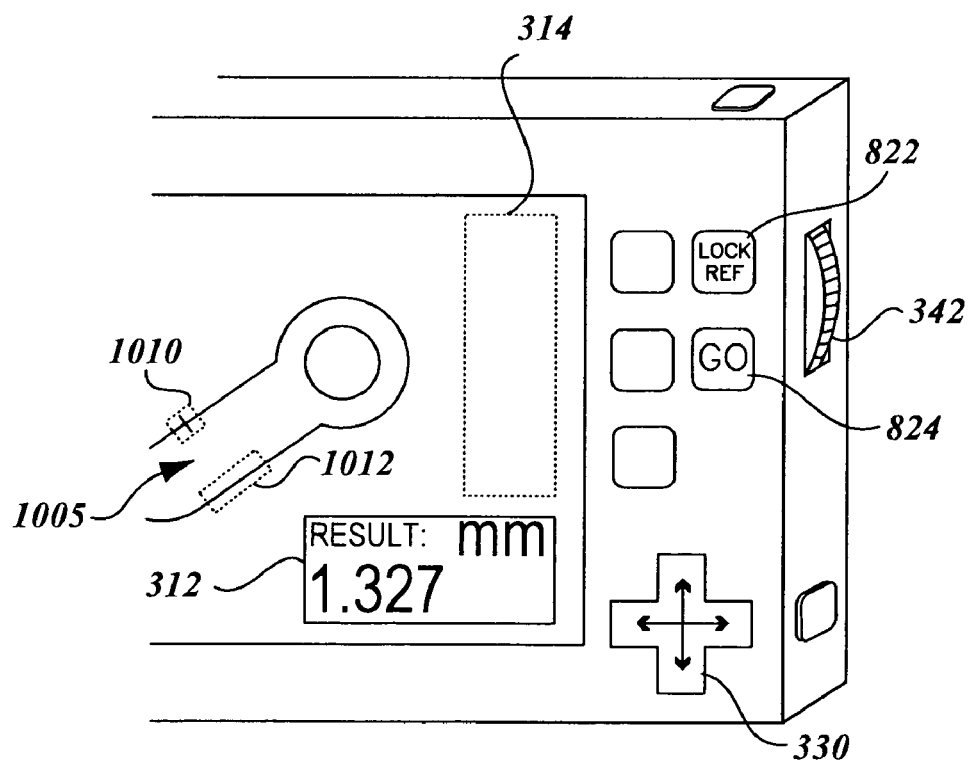

The user may then move the "currently active" line tool component 1012 to a desired measuring position on the measurement object 1005. In one embodiment, the user may first rotate the orientation of the line tool component 1012 as though it was rotated about a center of rotation at the edge point tool component 1010 reference location, as shown in FIG. 10C. In one embodiment, the thumbwheel 342 may be used to rotate or set the orientation. Then, as shown in FIG. 9D, the user may press the "GO" button 824 to accept and lock the orientation. In one embodiment, the "currently active" indicator may then disappear and be replaced by a "separation distance mode" indicator, such as the dashed line joining the tool components 1010 and 1012 in FIG. 10D. In one embodiment, the thumbwheel 342 may be used to adjust or set the location of the region of interest of the line tool component 1012 along the direction of the current orientation, (which may be along the direction of the dashed line "separation distance mode" indicator, for example), to a desired measuring position on the measurement object 1005. Then, with the region of interest indicators position to bound the edge features that provide the basis for the point-to-line distance measurement, the user may press the "GO" button, to cause the point-to-line tool to automatically determine the location of an edge point in the region of interest of the edge point tool component 1010, the location of a line defined by the linear edge in the region of interest of the line tool component 1012, and the distance of the edge point from the line along a direction perpendicular to the line. The determined point-to-line distance may then be displayed in the measurement result region 312. In addition, in various embodiments, when the "GO" button 824 is pressed to indicate completion of the previous measurement operations, the control element configuration and/or contents of the adaptive icon/label region 314 may be updated to include new control options associated with the control buttons 320'.

Figure 11A:
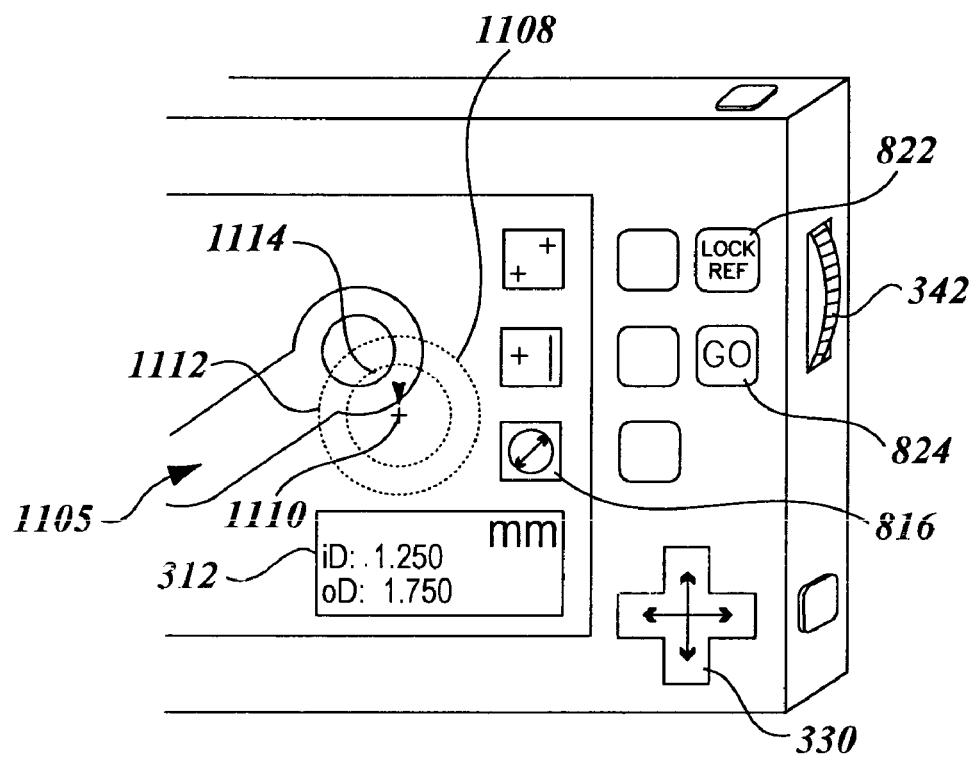
FIGS. 11A-11D are diagrams of the control panel and display portions of FIG. 8 illustrating the use of an exemplary circle tool.

FIGS. 11A-11D illustrate one exemplary set of operations usable to implement a circle video metrology tool. As shown in FIG. 11A, once the circle tool icon 816 is selected (for example, by pressing the adjacent control button), a circle tool 1108 having a center point tool component 1110, region of interest outer diameter tool component 1112, and region of interest inner diameter tool component 1114, may appear at a default location in the display region 310. The measurement result region 312 may begin to continuously update and display the current diameters of the region of interest outer and inner diameters 1112 and 1114. One of the tool components, in this case the center point tool component 1110, may include a "currently active" indicator, for example, the small arrowhead located just above the center point tool component 1110 in FIG. 11A, to show that it is the target for the next positioning or adjustment operation.

Figure 11B:
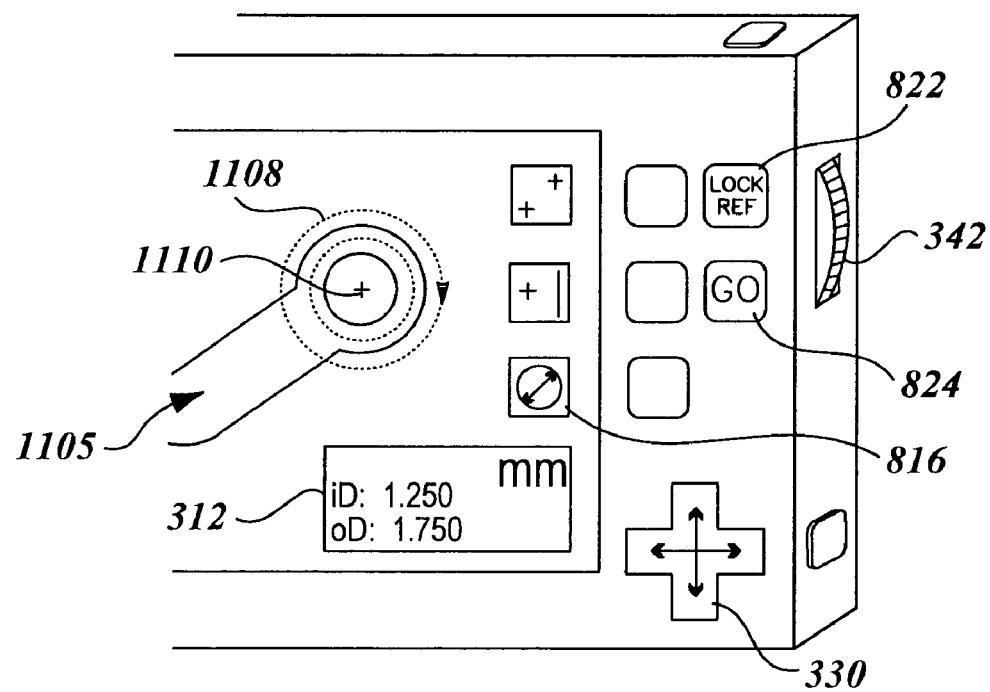
Figure 11C:
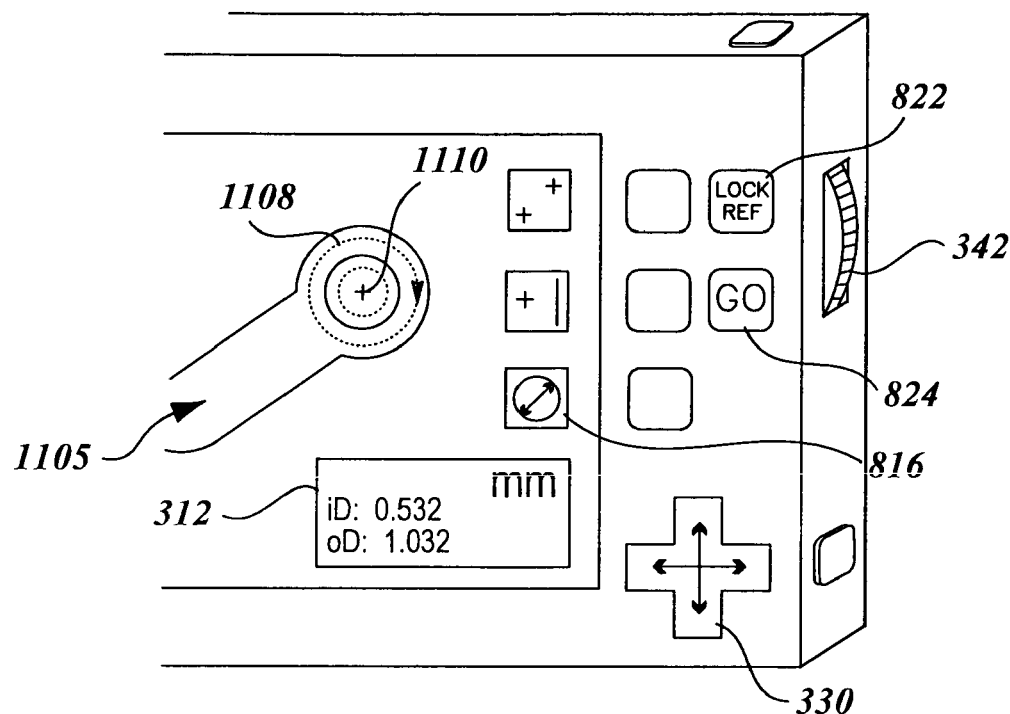
Figure 11D:
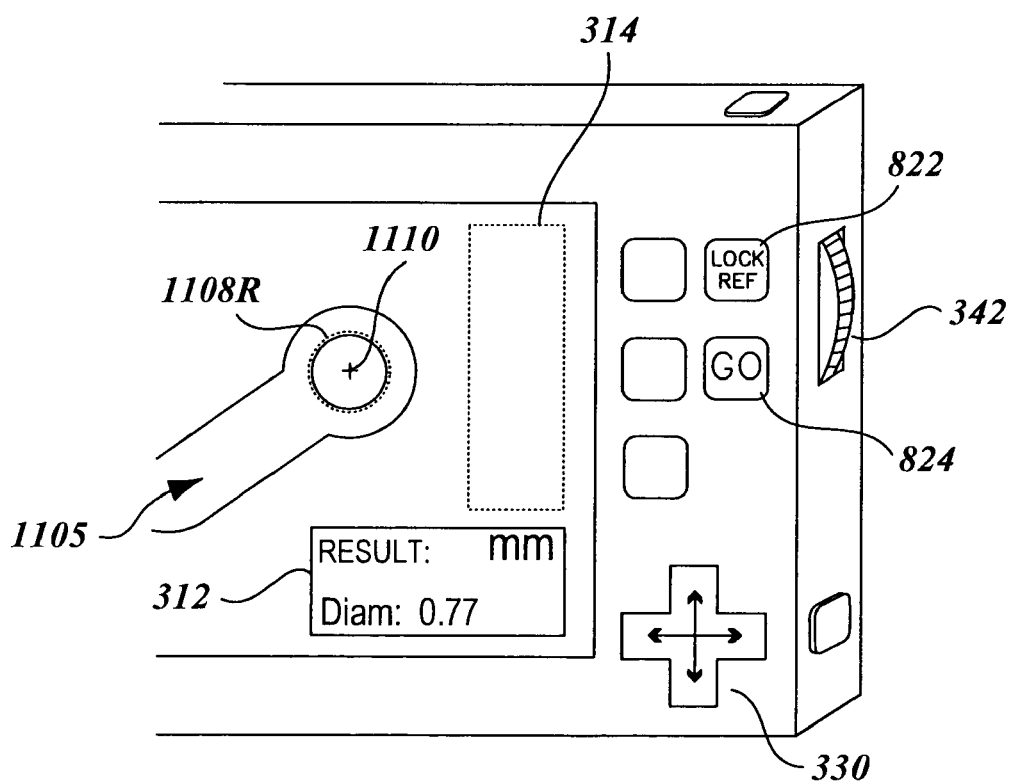

As shown in FIG. 11B, the user may then move the "currently active" center point tool component 1110 to a desired position on the measurement object 1105 using the cursor control 330, or other suitable control element. In the embodiment shown in FIG. 11B, the entire video tool 1108 is dragged along with this change in the position of the center point tool component 1110. After positioning the center point tool component 1110, the user may then press the "LOCK REF" button 822, to lock the current center position of the circle tool 1108. This operation may also trigger the "currently active" indicator to appear near the region of interest outer diameter tool component 1112, to show that it is the target for the next positioning or adjustment operation.

The user may then move the "currently active" region of interest outer diameter tool component 1112 to a desired diameter on the measurement object 1105. In the embodiment shown in FIG. 11C, the diameter of the region of interest inner diameter tool component 1114 changes in proportion to the diameter of the outer diameter tool component 1112, however, this need not be the case in various other embodiments where the inner diameter tool component 1114 may be adjusted independently. In various embodiments, the thumbwheel 342 may be used to set the diameter of the "currently active" region of interest outer diameter tool component 1112. Then, with the region of interest indicators positioned to bound the circular edge feature that provides the basis for circle measurement, the user may press the "GO" button, to cause the circle tool to automatically determine the location of edge points along the circular edge in the region of interest, and determine the diameter (and possibly the center location) of a circle fit to the determined edge points. The determined diameter may then be displayed in the measurement result region 312 and a corresponding best-fit circle may be displayed as an overlay on the circular feature that was measured. In addition, in various embodiments, when the "GO" button 824 is pressed to indicate completion of the previous measurement operations, the control element configuration and/or contents of the adaptive icon/label region 314 may be updated to include new control options associated with the control buttons 320'. The (x,y) coordinates of the circle center location may also be displayed in a convenient coordinate system in the measurement result region 312, if desired.

Figure 12:
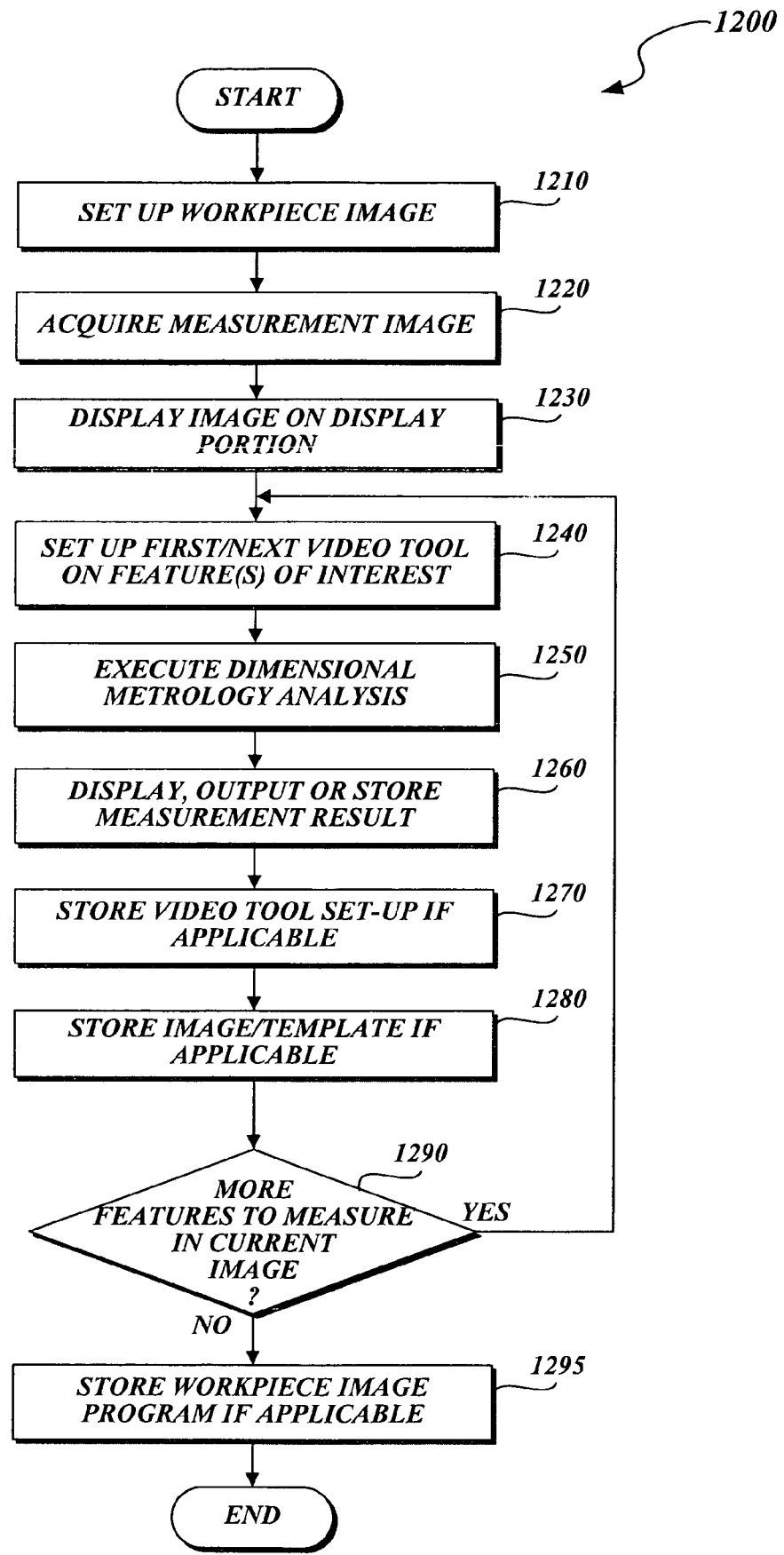
FIG. 12 is a flow diagram illustrative of one exemplary routine for the operation of a handheld metrology imaging device.

FIG. 12 is a flow diagram illustrative of one exemplary routine 1200 for the operation of a handheld metrology imaging device using a video tool such as one of the video tools of FIGS. 9, 10 and/or 11, for example. At a block 1210, a workpiece image is set up for image acquisition. That is, the handheld metrology imaging device is positioned to be properly focused on a desired workpiece feature to be inspected, and any other applicable image acquisition parameters are determined or set. For example, if an illumination portion of the handheld metrology imaging device is used, the lighting orientation and operating parameters, for example the lighting intensity, and-or strobe duration if applicable, and the like, are determined or set.

Because lighting may be an important image acquisition parameter in many applications, in various embodiments, a handheld metrology imaging device may include a lighting "freeze/unfreeze" button, such as the lighting button 355 shown in FIGS. 3 and 8. In one embodiment, when the lighting freeze/unfreeze button is pressed a first time, the lighting intensity is unfrozen such that the thumbwheel 342, or the like, may be used to rapidly and intuitively adjust the lighting intensity based on a real-time image displayed in the display region 310. When a desirable image is obtained, the lighting freeze/unfreeze button may be pressed again to freeze the light intensity setting, and the thumbwheel 342, or the like, may be disabled with respect to light intensity control, and/or its previous control function enabled.

At a block 1220, the measurement image is acquired. At a block 1230, the image is displayed on the display portion. At a block 1240, the first/next video tool is set up on the features of interest, for example, as previously described with respect to FIGS. 9-11, or by any other convenient set of operations. At a block 1250, the dimensional metrology analysis measurement result is determined. At a block 1260, the measurement result is displayed, outputted or stored. At a block 1270, the video tool operations and/or set up used to determine the previous measurement result are saved or stored, if applicable.

At a block 1280, an image template or inspection feature template may be stored, if applicable. That is, in some embodiments, a handheld metrology imaging device may include automatic template or pattern matching capabilities, according to known methods. In such embodiments, it may be useful to capture a portion of an image, for example, in the vicinity of the region of interest of the video tool used to obtain the previous measurement result, and save that portion of the image as a feature template. Such a feature template may be stored in association with the video tool operations and/or set up used to determine the previous measurement result for that feature. Then, when recalling or repeating those video tool operations for inspecting a similar feature, the feature template may be used to automatically locate the similar feature in a later-acquired inspection image, and the region(s) of interest associated with the recalled or repeated video tool operations may be automatically properly positioned relative to the automatically located similar feature.

At a decision block 1290, a determination is made by the user as to whether more features will be measured in the current image. If more features are to be measured, then the routine returns to the block 1240. If no more features are to be measured, then the routine continues to a block 1295, where the workpiece image program, that is, the sequence of operations used to obtain the previous measurement result (s), may be stored such that it may be repeated and/or recalled by an associated name, or storage address, or the like, if applicable.

Figure 13:
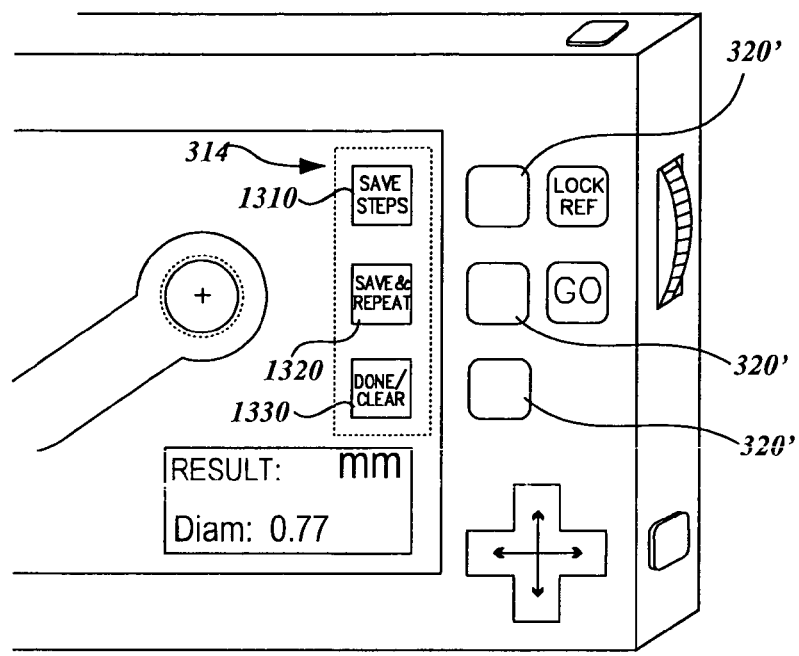
FIG. 13 is a diagram of the control panel and display portions of FIG. 8 illustrating one exemplary configuration of adaptable control elements usable in association with an exemplary measurement operation completion mode.

FIG. 13 is a diagram of the control panel and display portions of FIG. 8 illustrating one exemplary configuration of adaptable control elements usable in association with an exemplary measurement operation completion mode. As previously outlined with reference to FIGS. 9-11, in various embodiments, when the "GO" button 824 is pressed to indicate completion of the previous measurement operations, the control element configuration and/or contents of the adaptive icon/label region 314 may be updated to include new control options associated with the control buttons 320'. FIG. 13 shows one such set of new control options. As shown in FIG. 13, the adaptive icon/label region 314 may be updated to include a "SAVE STEPS" icon 1310, a "SAVE & REPEAT" icon 1320, and a "DONE/CLEAR" icon 1330, for example. The operations associated with the "SAVE STEPS" icon 1310, which may be activated by pressing the adjacent control button 320', may include storing the measurement operation sequence that was used to obtain the previous measurement result(s) in memory, and providing control elements, such as a menu or a touch sensitive alphanumeric keypad overlaying the display region 310, or the like, such that the user may enter or confirm a unique identifier that may be used to recall that measurement operation sequence at a later time. The operations associated with the "SAVE & REPEAT" icon 1320, which may be activated by pressing the adjacent control button 320', may include storing the measurement operation sequence that was used to obtain the previous measurement result(s) in memory, and immediately repeating the measurement operation sequence, for example, as described below with reference to FIG. 15. The operations associated with the "DONE/CLEAR" icon 1330, which may be activated by pressing the adjacent control button 320', may include clearing the screen overlay corresponding to the previous measurement operations and restoring the handheld metrology imaging system to a state that is ready to accept a new sequence of imaging and/or measurement operations.

Figure 14:
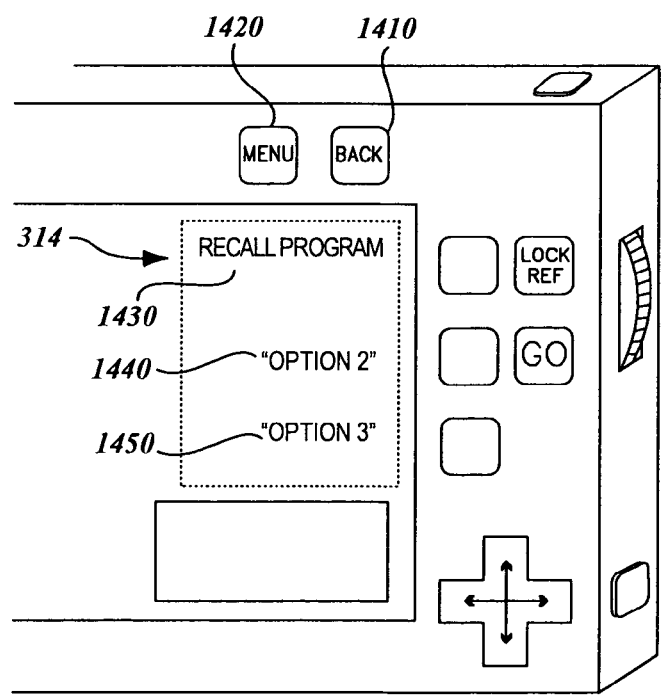
FIG. 14 is a diagram of the control panel and display portions of FIG. 8 illustrating one exemplary configuration of optional control elements usable in a handheld metrology imaging device.

FIG. 14 is a diagram of the control panel and display portions of FIG. 8 illustrating one exemplary configuration of additional or optional control elements that may be included in various embodiments of a handheld metrology imaging system. A "BACK" button 1410 may be provided, and may pressed in various operating states of the handheld metrology imaging system to "undo" the effects of a previous operation or control action, such that an alternative or corrected operation or control action may be performed instead. A "MENU" button 1420 may be provided, and may be pressed in various operating states of the handheld metrology imaging system to provide and/or display a new set of control options, file names, or the like, for selection by a user. In one embodiment, in an operation following completion of a previous sequence of measurement operations, or during a state immediately following power-on, or the like, when the "MENU" button 1420 is pressed, the adaptive icon/label region 314 may be updated to include a "RECALL PROGRAM" icon 1430, and other icon/labels 1440 and 1450, if desired, each of which may be activated by pressing the respective adjacent control button 320'. Then, when the control button 320' adjacent to the "RECALL PROGRAM" icon 1430 is pressed, a list or menu of the available previously-stored measurement operation sequences may be displayed for selection by the user. In one embodiment, the list or menu of the available previously-stored measurement operation sequences may be displayed in the adaptive icon/label region 314 in correspondence to the adjacent control buttons 320', which may be used to recall and initiate a desired measurement operation sequence. In such an embodiment, when an initial portion of the list or menu is displayed in the adaptive icon/label region 314, the thumbwheel 342, or the like, may be activated such that it may be used to rapidly "scroll" new portions of the list or menu through the adaptive icon/label region 314, such that they may be selected and activated by pressing the adjacent control buttons 320'.

Figure 15A:
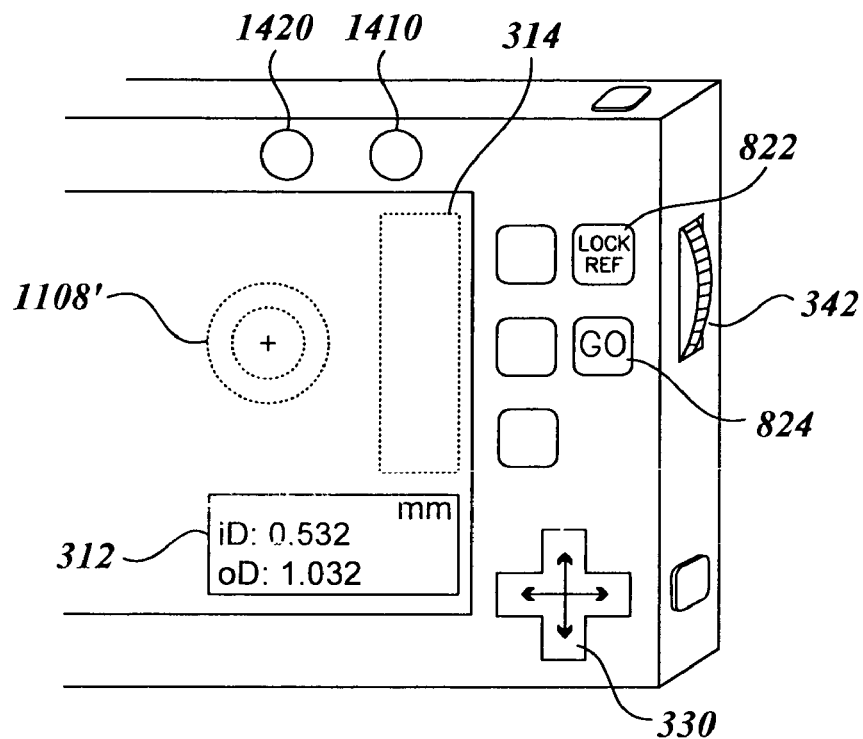
FIGS. 15A-15D are diagrams of the control panel and display portions of FIG. 8 illustrating the use of an exemplary program repeat or recall mode.

FIGS. 15A-15D illustrate one exemplary set of operations usable for a repeat or recall mode of operation for a handheld metrology imaging system. The operations are illustrated by an example where the operations previously described for the particular instance of the circle tool 1108 of FIGS. 11A-11D have been saved, for example by various control element operations outlined above, and then repeated or recalled. As shown in FIG. 15A, when the saved set of operations associated with the particular instance of the circle tool 1108 are repeated or recalled, the recalled instance of the circle tool may be displayed in the display region 310, as shown by the recalled circle tool 1108' in FIG. 15A (corresponding to the circle tool location and size parameters defined when the "GO" button was pressed to determine the measurement result, as previously described with reference to FIGS. 11C and 11D).

Figure 15B:
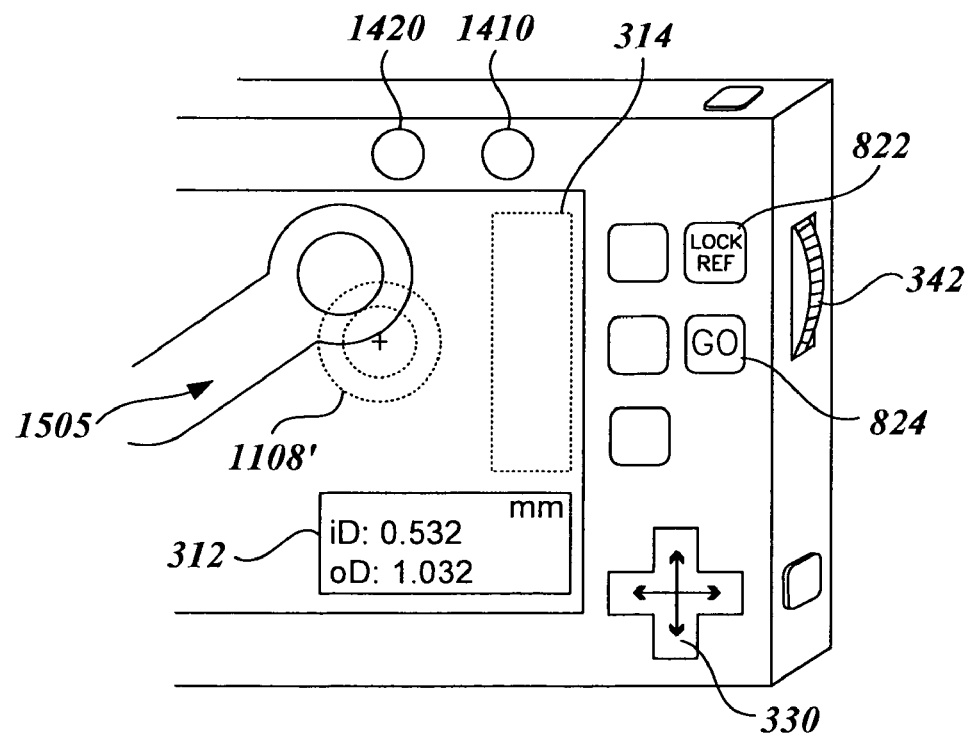
Figure 15C:
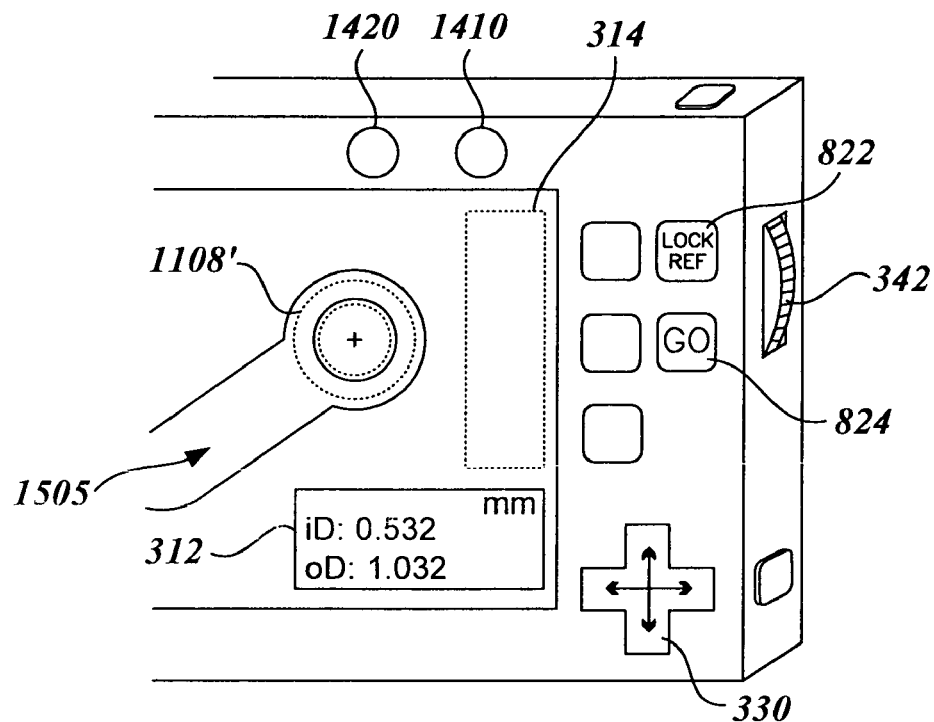
Figure 15D:
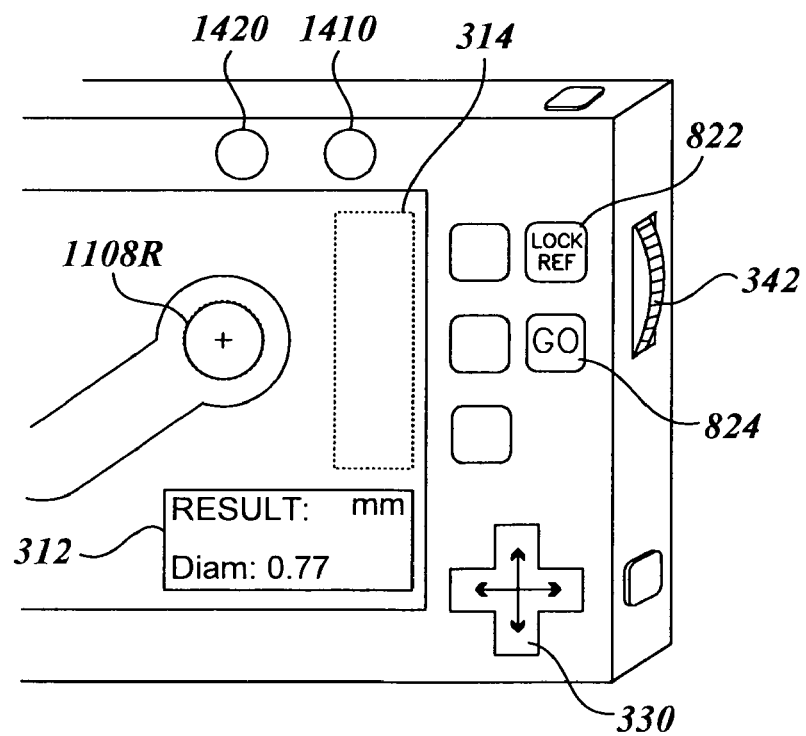

Then, as shown in FIG. 15B, the user may set up the workpiece feature that is desired to be inspected using the recalled circle tool 1108' by positioning the handheld metrology imaging device to be properly focused on the desired workpiece feature, and adjusting any other applicable image acquisition parameters, by any desired sequence of operations. FIG. 15B shows a real-time image of the desired workpiece feature, when it is not yet properly positioned relative to the recalled circle tool 1108'. In one embodiment, the previously outlined image acquisition freezing/unfreezing operations may be repeated until the desired workpiece feature is properly positioned relative to the recalled circle tool 1108' and clearly imaged, as shown in FIG. 15C. Then, the user may press the "GO" button 824, to cause the circle tool 1108' to automatically determine the location of edge points along the circular edge in the region of interest, and determine the diameter (and possibly the center location) of a circle fit to the determined edge points. The measurement results may then be displayed in the measurement result region 312 and the corresponding resulting best-fit circle 1108R may be displayed as an overlay on the circular feature that was measured. In addition, in various embodiments, when the "GO" button 824 is pressed to indicate completion of the previous measurement operations, the control element configuration and/or contents of the adaptive icon/label region 314 may be updated to include new control options associated with the control buttons 320'.

Figure 16:
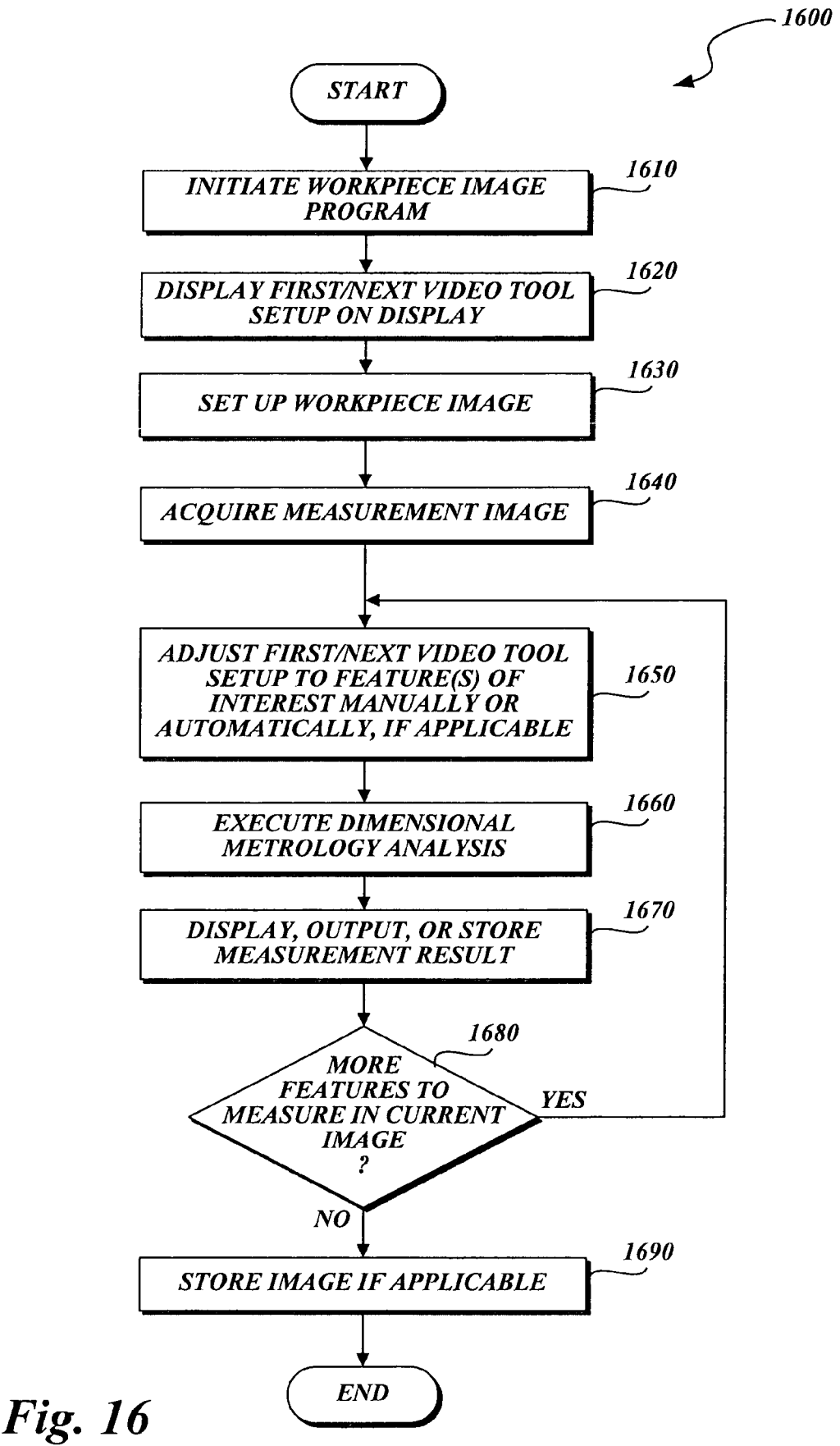
FIG. 16 is a flow diagram illustrative of one exemplary routine for the operation of a handheld metrology imaging device including a repeat or recall mode of operation.

FIG. 16 is a flow diagram illustrative of one exemplary routine 1600 for the operation of a handheld metrology imaging device including a repeat or recall mode of operation. At a block 1610, a workpiece image program is initiated by a repeat or recall operation, for example, by one of the applicable methods outlined previously. At a block 1620, a first/next recalled video tool is displayed on the display, for example, in a manner analogous to that previously outlined for the video tool 1108' shown in FIG. 15A. At a block 1630, the workpiece image acquisition is set up for a desired feature to be inspected, for example, in a manner analogous to that previously outlined for the video tool 1108' shown in FIG. 15B. At a block 1640, a measurement image is acquired.

At a block 1650, the first/next video tool set up is adjusted to the features of interest either manually or automatically, if applicable. In various embodiments, the measurement image may be acquired, and the first/next video tool set up is "adjusted", as the end result of a number of freeze/unfreeze cycles and adjustments, in a manner analogous to that previously outlined for the video tool 1108' shown in FIGS. 15B and 15C. In various other embodiments, a recalled video tool may be directly modified or adjusted by operations similar to those described with reference to an "original" video tool in FIGS. 9-11, to properly correspond to the desired feature to be inspected.

At a block 1660, the dimensional metrology analysis is executed, for example, when the user presses a "GO" button, or the like. At a block 1670, the measurement result is displayed, outputted, or stored. At a decision block 1680, the repeated or recalled sequence of operations determines whether there are more features to be measured in the current image. If there are more features to be measured, then the routine returns to the block 1650. If there are no more features to be measured, then the routine continues to a block 1690, where the image maybe stored for future reference or output, if desired.

FIGS. 17A-17D are diagrams of a second exemplary embodiment of a handheld dimensional metrology imaging device 1700 in accordance with the present invention. As shown in the plan view of FIG. 17A, the device 1700 includes a body 1702 with a handle 1705 which may pivot about the body 1702 (at a hinge 1740, best seen in FIG. 17C). The body 1702 includes a display region 1710, which may include an a fixed or adaptable control icon region 1714, which may include icons activatable using touchscreen or stylus activation methods, or the like. The display region 1710 may also include a first measurement result region 1712 that is used to display measurement results in the proper orientation when the handle 1705 is positioned as shown in solid outline in FIG. 17A, and second measurement result region 1712' that is used to display measurement results in the proper orientation when the handle 1705 is positioned as shown in dashed outline in FIG. 17A. Other screen overlay elements may be similarly adaptively reoriented based on the orientation of the handle 1705 relative to the body 1702, if desired. The orientation of the handle 1705 relative to the body 1702 may be determined by any applicable method, for example, by a switch that is activated based on the position of the handle 1705.

The handle 1705 is shown to include control buttons, which may include, for example, an image acquisition button 1722 that may function in a manner previously described for the image acquisition buttons 344 and 354, a mini-joystick or thumb stick or cursor control 1724, a lock reference button 1726 that may function in a manner previously described for the "LOCK REF" button 822, a "GO" button 1728 that may function in a manner previously described for the "GO" button 824, and a thumbwheel 1729 that may function in a manner previously described for the thumbwheel 342. As shown in the end view of FIG. 17B, the handle 1705 may be rotatable about its length axis, such that the body 1702 and the display region 1710 may be positioned in an ergonomic manner for a variety of different operating orientations relative to different workpieces and relative to the user. It should be appreciated that the various control elements on the 1705 may be arranged such that all manual control operations can be performed by a user using the fingers of a hand that is also gripping the handle and supporting the a handheld dimensional metrology imaging device 1700, if desired.

As best shown in FIG. 17C, a camera assembly 1782 (analogous to previously described camera and optical elements) may be provided on the side of the body 1702 that is opposite to the side that includes the display region 1710. FIG. 17D shows a side view of the handheld metrology imaging device 1700, further illustrating one exemplary arrangement of the camera assembly 1782 and illumination sources 1784.

While the preferred embodiment of the invention has been illustrated and described, numerous variations in the illustrated and described arrangements of features and sequences of operations will be apparent to one skilled in the art based on this disclosure. Thus, it will be appreciated that various changes can be made therein without departing from the spirit and scope of the invention.

The embodiments of the invention in which an exclusive property or privilege is claimed are defined as follows:

1. A compact hand-holdable dimensional metrology imaging device, the device comprising:
   an imaging portion;
   a display portion;
   a signal processing and control portion;
   a user interface comprising:
   at least one user-adjustable video measurement tool comprising at least one user-adjustable region of interest indicator that is displayed overlaying an image on the display portion, wherein at least one of the location and the size of the region of interest indicator is user-adjustable relative to the image on the display portion, and
   a plurality of control elements, the control elements comprising an image acquisition control element and at least one video measurement tool adjustment control element for adjusting the at least one region of interest indicator, and
   at least one preprogrammed measurement function that operates to provide a dimensional measurement result based at least on the configuration of the video measurement tool, the at least one preprogrammed measurement function including automatic edge detection for at least one workpiece edge feature located in a user-adjustable region of interest indicator of the video measurement tool and determining the measurement result based at least partly on the results of the automatic edge detection.

2. The metrology imaging device of claim 1, wherein the position of the imaging portion is linearly adjustable along at least one direction relative to the display portion.

3. The metrology imaging device of claim 2, wherein the orientation of the imaging portion is rotationally adjustable about at least one axis relative to the display portion.

4. The metrology imaging device of claim 2, wherein,
   the display portion is included within a control and display portion housing that includes a mechanical interface feature that can abut a surface of the workpiece;
   the imaging portion has a focusing distance;
   the position of the imaging portion is linearly adjustable within an adjustment range along a direction toward and away from the mechanical interface feature and the abutting surface of the workpiece such that the focusing distance coincides with a desired workpiece plane to be imaged when the mechanical interface feature abuts the surface of the workpiece.

5. The metrology imaging device of claim 1, the user interface further comprising at least one orientation-adaptable video overlay element displayable in at least two respective overlay element orientations relative to the display portion, each of the respective overlay element orientations usable for at least one respective operating orientation of the hand-positionable dimensional metrology imaging device.

6. The metrology imaging device of claim 5, wherein the image acquisition control element comprises a pair of respective buttons having different respective orientations relative to the display portion, wherein each of the pair of respective buttons is usable for image acquisition control for at least one respective orientation of the hand-positionable dimensional metrology imaging device.

7. The metrology imaging device of claim 5, wherein the at least one orientation-adaptable video overlay element comprises a measurement result display.

8. The metrology imaging device of claim 5, further comprising at least one orientation sensor operable to provide an output that depends on its orientation relative to gravity, wherein the at least one orientation-adaptable video overlay element is displayed in an orientation that depends on the orientation of the orientation sensor relative to gravity.

9. The metrology imaging device of claim 1, wherein the control elements comprise:
  a locking button that operates to lock the location of a currently active region of interest indicator of a video measurement tool such that it ceases to be currently active and at the same time makes another region of interest indicator of the video measurement tool currently active; and
  at least one variable adjustment control element that alters at least one of a location, an orientation, and a size of a currently active region of interest indicator of a video measurement tool.

10. The metrology imaging device of claim 9, wherein:
  the video measurement tool that comprises at least one user-adjustable region of interest indicator comprises first and second independently locatable region of interest indicators at first and second respective locations on the display portion;
  at least one of the first and second regions of interest indicators is controllable by the locking button to have its location locked such that it includes a desired workpiece feature in an image displayed on the display portion; and
  when one of the first and second regions of interest indicators is locked by the locking button, the other of the first and second regions of interest becomes currently active and is controllable by a variable adjustment control element to have at least one of its location, orientation, and size adjusted relative to the locked one of the first and second regions of interest.

11. The metrology imaging device of claim 10, wherein the video measurement tool that comprises first and second independently locatable region of interest indicators is one of (a) a point-to-line distance measurement tool, and (b) a circle measurement tool.

12. The metrology imaging device of claim 11, wherein a preprogrammed measurement function associated with the point-to-line distance measurement tool provides automatic edge detection for at least one workpiece edge feature located in a user-adjustable region of interest, and determines the location of a line corresponding to the workpiece edge feature based on the results of the automatic edge detection.

13. The metrology imaging device of claim 11, wherein a preprogrammed measurement function associated with the circle measurement tool provides automatic edge detection for at least one circular edge feature located in a user-adjustable region of interest, and determines a measurement result for the circle based on the results of the automatic edge detection.

14. The metrology imaging device of claim 10, wherein the currently active region of interest that is controllable by the variable adjustment control element is controllable such that the variable adjustment control element repositions the currently active region of interest along a radial direction from a center located at a position within the region of interest that has its location locked, without rotating the orientation of the currently active region of interest about the center.

15. The metrology imaging device of claim 10, wherein the variable adjustment control element comprises a rotatable variable adjustment control element usable to control at least one of (a) the rotational orientation of a currently active region of interest indicator about a center of rotation located within a region of interest indicator that has its location locked, (b) the location of a currently active region of interest indicator of a video measurement tool along a radial direction from a center located within a region of interest that has its location locked, and (c) the diameter of at least one boundary of a region of interest indicator of a circle-type video measurement tool.

16. The metrology imaging device of claim 15, wherein the rotatable variable adjustment control element is usable to control each of (a), (b) and (c).

17. The metrology imaging device of claim 10, wherein the video measurement tool further comprises a "currently active" indicator that is displayed proximate to the currently active region of interest indicator.

18. The metrology imaging device of claim 10, wherein the currently active region of interest that is controllable by the variable adjustment control element is controllable such that the variable adjustment control element rotates the orientation of the currently active region of interest about a center of rotation located at the position within the region of interest that has its location locked.

19. The metrology imaging device of claim 1, wherein each video measurement tool adjustment control element for adjusting the at least one region of interest indicator is configured to be operated by a single finger of the user for adjusting the at least one region of interest indicator.

20. The metrology imaging device of claim 19, wherein the device further comprises a handle, and each video measurement tool adjustment control element for adjusting the at least one region of interest indicator is positioned on the handle, and the handle is pivotable relative to the display portion.

* * * * *